(12) United States Patent
Chan et al.

(10) Patent No.: US 10,223,156 B2
(45) Date of Patent: Mar. 5, 2019

(54) INITIATING BACKGROUND UPDATES BASED ON USER ACTIVITY

(71) Applicant: Apple Inc., Cupertino, CA (US)

(72) Inventors: David Michael Chan, Palo Alto, CA (US); John Iarocci, Los Gatos, CA (US); Gaurav Kapoor, Santa Clara, CA (US); Kit-man Wan, Cupertino, CA (US); Phillip Stanley-Marbell, San Francisco, CA (US); Jonathan J. Andrews, San Jose, CA (US); Matthew E. Shepherd, Mountain View, CA (US); Amit K. Vyas, Cupertino, CA (US); Anand Ramadurai, Los Gatos, CA (US); Lee Russell, Sunnyvale, CA (US); Brittany D. Hughes, San Jose, CA (US); David B. Myszewski, San Jose, CA (US); Andrew M. Matuschak, San Francisco, CA (US); Joshua V. Graessley, Sunnyvale, CA (US); Marc Krochmal, Santa Clara, CA (US); Daniel Vinegrad, Palo Alto, CA (US); Stephen C. Peters, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 14/253,781

(22) Filed: Apr. 15, 2014

(65) Prior Publication Data

US 2014/0366042 A1 Dec. 11, 2014

Related U.S. Application Data

(60) Provisional application No. 61/832,932, filed on Jun. 9, 2013.

(51) Int. Cl.
*G06F 9/48* (2006.01)
*H04L 29/08* (2006.01)
(Continued)

(52) U.S. Cl.
CPC .......... *G06F 9/4825* (2013.01); *G06F 1/3206* (2013.01); *G06F 1/3212* (2013.01);
(Continued)

(58) Field of Classification Search
CPC .... G06F 9/4825; G06F 1/3206; G06F 1/3212; G06F 11/3409; G06F 11/3058;
(Continued)

(56) References Cited

U.S. PATENT DOCUMENTS 6,859,829 B1 2/2005 Parupudi et al.
6,993,556 B1 1/2006 Seliger et al.
(Continued)

FOREIGN PATENT DOCUMENTS

CN 102866921 A 1/2013
EP 2328324 6/2011
(Continued)

OTHER PUBLICATIONS

Hamza Khalid; Limit Usage for Any iPhone App by Time, Frequency & More With AppCap; Feb. 12, 2013; 6 pages.*
(Continued)

*Primary Examiner* — S. Sough
*Assistant Examiner* — Kimberly L Jordan
(74) *Attorney, Agent, or Firm* — Invoke

(57) ABSTRACT

In some implementations, a mobile device can be configured to monitor environmental, system and user events. The occurrence of one or more events can trigger adjustments to system settings. In some implementations, the mobile device can be configured to keep frequently invoked applications up to date based on a forecast of predicted invocations by the
(Continued)

user. In some implementations, the mobile device can receive push notifications associated with applications that indicate that new content is available for the applications to download. The mobile device can launch the applications associated with the push notifications in the background and download the new content. In some implementations, before running an application or accessing a network interface, the mobile device can be configured to check energy and data budgets and environmental conditions of the mobile device to preserve a high quality user experience.

20 Claims, 16 Drawing Sheets

(51) Int. Cl.
G06F 1/3206 (2019.01)
G06F 1/3212 (2019.01)
G06F 11/34 (2006.01)
H04M 1/725 (2006.01)
G06F 11/30 (2006.01)

(52) U.S. Cl.
CPC ...... *G06F 11/3409* (2013.01); *H04L 67/2842* (2013.01); *G06F 11/3058* (2013.01); *G06F 11/3438* (2013.01); *G06F 2201/86* (2013.01); *G06F 2201/88* (2013.01); *H04M 1/72522* (2013.01); *Y02D 10/174* (2018.01)

(58) Field of Classification Search
CPC ............. G06F 11/3438; G06F 2201/86; G06F 2201/88; H04L 67/2842; H04M 1/72522
See application file for complete search history.

(56) References Cited

U.S. PATENT DOCUMENTS

| | | |
|---|---|---|
| 6,996,441 B1 | 2/2006 | Tobias |
| 7,065,575 B1 | 6/2006 | Machiraju et al. |
| 7,376,723 B2 | 5/2008 | Cho et al. |
| 7,392,044 B2 | 6/2008 | Hayes |
| 7,415,391 B2 | 8/2008 | Chen |
| 7,562,234 B2 | 7/2009 | Conroy |
| 7,698,276 B2 | 4/2010 | Seshadri et al. |
| 7,911,509 B2 | 3/2011 | Jenbro |
| 7,949,888 B2 | 5/2011 | Cox |
| 8,032,472 B2 | 10/2011 | Tsui |
| 8,126,993 B2 | 2/2012 | Carraher et al. |
| 8,231,057 B1 | 7/2012 | Buentello et al. |
| 8,260,911 B2 | 9/2012 | Xu et al. |
| 8,305,728 B2 | 11/2012 | Lee et al. |
| 8,321,057 B2 | 11/2012 | Maly |
| 8,327,349 B2 | 12/2012 | Chu et al. |
| 8,510,569 B2 | 8/2013 | Smith et al. |
| 8,521,809 B2 | 8/2013 | Arnold et al. |
| 8,589,955 B2 | 11/2013 | Roundtree |
| 8,634,810 B2 | 1/2014 | Barkie et al. |
| 8,683,037 B2 | 3/2014 | Wyld et al. |
| 8,693,391 B2 | 4/2014 | Garcia-Martin |
| 8,775,631 B2 | 7/2014 | Luna |
| 8,788,881 B2 | 7/2014 | Salomon et al. |
| 8,874,026 B2 | 10/2014 | Anstandig |
| 8,874,781 B2 | 10/2014 | Khorashadi et al. |
| 8,887,091 B2 | 11/2014 | Yamaji et al. |
| 8,887,182 B2 | 11/2014 | Low et al. |
| 8,897,782 B2 | 11/2014 | Holostov |
| 8,904,216 B2 | 12/2014 | Cullimore |
| 8,943,204 B2 | 1/2015 | Caldeira de Andrada |
| 8,996,332 B2 | 3/2015 | Kahn et al. |
| 9,038,134 B1 | 5/2015 | Ackerman |
| 9,049,250 B2 | 6/2015 | Morse et al. |
| 9,117,252 B2 | 8/2015 | Sogo |
| 9,250,958 B2 | 2/2016 | Mark et al. |
| 9,477,734 B2 | 10/2016 | Tewari et al. |
| 9,979,591 B2 | 5/2018 | Babu |
| 2002/0080155 A1 | 6/2002 | Abbott et al. |
| 2002/0087643 A1 | 7/2002 | Parsons et al. |
| 2003/0047604 A1 | 3/2003 | McClure et al. |
| 2003/0067386 A1 | 4/2003 | Skinner |
| 2003/0182394 A1 | 9/2003 | Ryngler et al. |
| 2003/0200264 A1 | 10/2003 | Brill |
| 2004/0128663 A1 | 7/2004 | Rotem |
| 2004/0188511 A1 | 9/2004 | Sprigg et al. |
| 2005/0120389 A1 | 6/2005 | Boss et al. |
| 2005/0125701 A1 | 6/2005 | Hensbergen |
| 2005/0154711 A1 | 7/2005 | McConnell |
| 2005/0252963 A1 | 11/2005 | Adams et al. |
| 2006/0031371 A1 | 2/2006 | Uthe |
| 2006/0168014 A1 | 7/2006 | Wang |
| 2006/0271827 A1 | 11/2006 | Cascaval et al. |
| 2007/0067373 A1 | 3/2007 | Higgins et al. |
| 2007/0185933 A1 | 8/2007 | Dao et al. |
| 2008/0163050 A1 | 7/2008 | Yamaji et al. |
| 2008/0248789 A1 | 10/2008 | Song et al. |
| 2009/0165132 A1 | 6/2009 | Jain et al. |
| 2009/0199029 A1 | 8/2009 | Arimilli et al. |
| 2009/0240947 A1* | 9/2009 | Goyal ............... H04L 9/3271 713/176 |
| 2009/0282130 A1 | 11/2009 | Antoniou et al. |
| 2010/0015926 A1 | 1/2010 | Luff |
| 2010/0241888 A1 | 9/2010 | Kaneko et al. |
| 2010/0293049 A1 | 11/2010 | Maher et al. |
| 2010/0332876 A1 | 12/2010 | Fields, Jr. et al. |
| 2011/0016476 A1 | 1/2011 | Raju |
| 2011/0060996 A1 | 3/2011 | Alberth, Jr. et al. |
| 2011/0145598 A1 | 6/2011 | Smith et al. |
| 2011/0195699 A1 | 8/2011 | Tadayon et al. |
| 2012/0023226 A1 | 1/2012 | Petersen |
| 2012/0042002 A1 | 2/2012 | Smith et al. |
| 2012/0135756 A1 | 5/2012 | Rosso et al. |
| 2012/0154633 A1 | 6/2012 | Rodriguez |
| 2012/0164982 A1 | 6/2012 | Klein |
| 2012/0179502 A1 | 7/2012 | Farooq et al. |
| 2012/0209946 A1* | 8/2012 | McClure ............ H04N 21/233 709/217 |
| 2012/0316774 A1 | 12/2012 | Yariv et al. |
| 2012/0324248 A1* | 12/2012 | Schluessler ......... G06F 1/3253 713/300 |
| 2013/0006719 A1 | 1/2013 | Green et al. |
| 2013/0067492 A1 | 3/2013 | Fidler et al. |
| 2013/0080641 A1 | 3/2013 | Lui |
| 2013/0179267 A1 | 7/2013 | Lee |
| 2013/0204944 A1 | 8/2013 | Robinson et al. |
| 2013/0204948 A1 | 8/2013 | Zeyliger et al. |
| 2013/0226856 A1 | 8/2013 | Zhang et al. |
| 2013/0267254 A1 | 10/2013 | Zhang |
| 2013/0275994 A1 | 10/2013 | Uola et al. |
| 2013/0303195 A1 | 11/2013 | Bahl |
| 2013/0329562 A1 | 12/2013 | Murakami |
| 2013/0332524 A1 | 12/2013 | Fiala et al. |
| 2014/0067779 A1 | 3/2014 | Ojha |
| 2014/0068207 A1 | 3/2014 | Aslot et al. |
| 2014/0075234 A1 | 3/2014 | Stekkelpak et al. |
| 2014/0082383 A1 | 3/2014 | de Cesare et al. |
| 2014/0082501 A1 | 3/2014 | Bae et al. |
| 2014/0115146 A1 | 4/2014 | Johnson et al. |
| 2014/0117921 A1 | 5/2014 | Suomela |
| 2014/0123022 A1 | 5/2014 | Lee et al. |
| 2014/0128105 A1 | 5/2014 | Su et al. |
| 2014/0143791 A1* | 5/2014 | Mark .................. G06F 9/485 719/318 |
| 2014/0153457 A1 | 6/2014 | Liu |
| 2014/0156834 A1 | 6/2014 | Wyld et al. |
| 2014/0163849 A1 | 6/2014 | Adam et al. |
| 2014/0164074 A1 | 6/2014 | Theo |
| 2014/0200691 A1 | 7/2014 | Lee et al. |
| 2014/0201315 A1 | 7/2014 | Jacob et al. |
| 2014/0343946 A1 | 11/2014 | Torok et al. |
| 2014/0362768 A1 | 12/2014 | Wood et al. |
| 2014/0364104 A1 | 12/2014 | Wood et al. |
| 2014/0366041 A1 | 12/2014 | Stanley-Marbell et al. |
| 2014/0366042 A1 | 12/2014 | Chan et al. |

(56) References Cited

U.S. PATENT DOCUMENTS

| | | | |
|---|---|---|---|
| 2015/0031312 A1 | 1/2015 | Wang et al. |
| 2015/0088422 A1 | 3/2015 | Nikovski et al. |
| 2015/0134392 A1 | 5/2015 | Wagoner |
| 2015/0153810 A1 | 6/2015 | Sasidharan |
| 2015/0208219 A1 | 7/2015 | Bowers |
| 2015/0256993 A1 | 9/2015 | Bellamkonda |
| 2015/0264557 A1 | 9/2015 | Exterman |
| 2015/0324698 A1 | 11/2015 | Karaoguz et al. |
| 2015/0350885 A1 | 12/2015 | Stanley-Marbell et al. |

FOREIGN PATENT DOCUMENTS

| | | | |
|---|---|---|---|
| EP | 2568384 | | 3/2013 |
| JP | 2008-507015 | A | 3/2008 |
| KR | 10-2005-0022010 | A | 3/2005 |
| KR | 10-2011-0082585 | A | 7/2011 |
| KR | 10-2012-0037988 | A | 4/2012 |
| KR | 10-2014-0015159 | A | 2/2014 |
| TW | I272527 | | 2/2007 |
| TW | I375906 | | 11/2012 |
| TW | I389032 | | 3/2013 |
| TW | 201504805 | | 2/2015 |
| WO | 2013/024279 | A1 | 2/2013 |
| WO | 2015/004805 | A1 | 1/2015 |
| WO | 2015/183515 | A1 | 12/2015 |
| WO | 2016/196497 | A1 | 12/2016 |

OTHER PUBLICATIONS

Yan, Tingxin et al., "Fast App Launching for Mobile Devices Using Predictive User Context", University of Massachusetts Amherst, Microsoft Research, MobiSys 12, Jun. 25-29, 2012, Low Wood Bay, Lake District, UK, Copyright 2012, ACM 978-1-4503-1301, BNSDOCID:<XP_55106616A_1>, 14 pages.

Shin, et al., "Understanding and Prediction of Mobile Application Usage for Smart Phones," UbiComp' 12, Sep. 5-8, 2012, pp. 173-182.

Oliner, et al., Carat: Collaborative Energy Diagnosis for Mobile Devices, Sensys 13, Nov. 11-15, 2013, pp. 1-16.

Cho, et al., "A Battery Lifetime Guarantee Scheme for Selective Applications in Smart Mobile Devices," IEEE Transactions on Consumer Electronics, vol. 60, No. 1, Mar. 20, 2014, pp. 155-163.

Jungwook et al., "A Battery Lifetime Guarantee Scheme for Selective Applications in Smart Mobile Devices," IEEE Transactions on Consumer Electronics, New York, NY, vol. 60, No. 1, pp. 155-163, Feb. 2014.

Anonymous: "Local and Remote Notification Programming Guide", Mar. 9, 2015, pp. 1-67, Retrieved from the Internet: URL:https://web.archive.org/web/20150320231900/https:developer.aplle.com/library/ios/documetation/NetworkingInternet/conceptual/RemoteNotificationsPG/RemoteNotificationPG.pdf.

* cited by examiner

INITIATING BACKGROUND UPDATES BASED ON USER ACTIVITY

CROSS-REFERENCE TO RELATED APPLICATION

This application claims priority to U.S. Provisional Patent Application No. 61/832,932, entitled "Initiating Background Updates Based on User Activity," filed on Jun. 9, 2013, the entire contents of which are incorporated herein by reference.

TECHNICAL FIELD

The disclosure generally relates to adjusting components of a computer system based on user behavior.

BACKGROUND

Mobile computing devices are typically battery operated. Some mobile computing devices can wirelessly access network resources over cellular data and/or Wi-Fi network connections. These mobile devices are often constrained by battery capacity and limits on cellular data.

Some mobile computing devices allow a user to run applications that access data from network resources. The user typically invokes an application and then must wait for the application to retrieve data from the network resources so that the application can present current updated content.

SUMMARY

In some implementations, a mobile device can be configured to monitor environmental, system and user events. The mobile device can be configured to detect the occurrence of one or more events that can trigger adjustments to system settings.

In some implementations, the mobile device can be configured to keep frequently invoked applications up to date. The mobile device can keep track of when applications are invoked by the user. Based on the invocation information, the mobile device can forecast when during the day the applications are invoked. The mobile device can then preemptively launch the applications and download updates so that the user can invoke the applications and view current updated content without having to wait for the application to download updated content.

In some implementations, the mobile device can receive push notifications associated with applications that indicate that new content is available for the applications to download. The mobile device can launch the applications associated with the push notifications in the background and download the new content. After the content is downloaded, the mobile device can present a graphical interface indicating to the user that the push notification was received. The user can then invoke the applications and view the updated content.

In some implementations, the mobile device can be configured to perform out of process downloads and/or uploads of content for applications on the mobile device. For example, a dedicated process can be configured on the mobile device for downloading and/or uploading content for applications on the mobile device. The applications can be suspended or terminated while the upload/download is being performed. The applications can be invoked when the upload/download is complete.

In some implementations, before running an application or accessing a network interface, the mobile device can be configured to check battery power and cellular data usage budgets to ensure that enough power and data is available for user invoked operations. Before launching an application in the background, the mobile device can check usage statistics to determine whether the application is likely to be invoked by a user in the near future.

Particular implementations provide at least the following advantages: Battery power can be conserved by dynamically adjusting components of the mobile device in response to detected events. The user experience can be improved by anticipating when the user will invoke applications and downloading content so that the user will view updated content upon invoking an application.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

According to implementations, described herein is a system architecture for enabling adaptation of a mobile device to user behavior to facilitate tradeoffs between battery lifetime, power requirements, thermal management and performance. The system provides the underlying event and statistics gathering architecture and a set of heuristic processes that learn from a user's network conditions and application usage patterns over time to maximize battery life without noticeable degradation in the user experience. This system can anticipate a user's future behavior as well as the user's expectation of device performance based on dynamically-gathered statistics and/or explicitly-specified user intent. The system can determine which hardware and software control parameters to set and to what values to set the parameters in order to improve the user experience for the anticipated user behavior. The system leverages user monitoring and hardware control to achieve an overall improvement in the user experience while extending system and network resources available to the mobile device. Thus, the system can maximize system and network resources while minimizing the impact to the user experience.

Data Collection—User Centric Statistics

Figure 1:
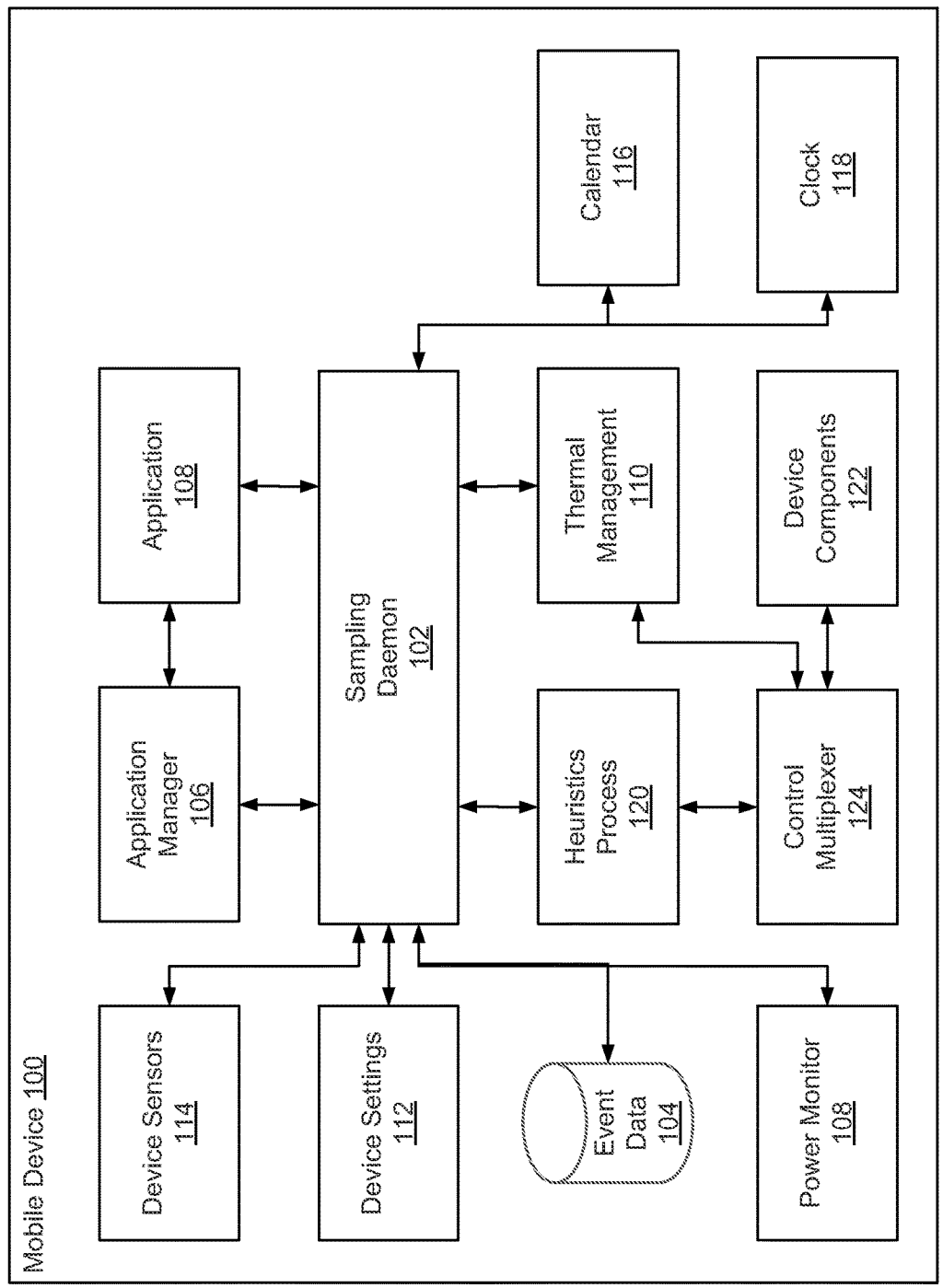
FIG. 1 illustrates a mobile device 100 configured to perform dynamic adjustment of the mobile device.

FIG. 1 illustrates a mobile device 100 configured to perform dynamic adjustment of the mobile device 100. In some implementations, mobile device 100 can include a sampling daemon 102 that collects events related to device conditions, network conditions and user behavior. For example, sampling daemon 102 can collect statistics related to applications, sensors and user input received by mobile device 100 and store the statistics in event data store 104. All of the statistics generated or collected can include a timestamp that indicates the time and time zone when the statistic was generated or collected and/or a geographical location. The geographical location can be determined based on global navigation satellite system signals, cellular transmission signals, Wi-Fi signals or any other location determining methodology.

In some implementations, sampling daemon 102 can receive application usage statistics from application manager process 106. For example, application manager 106 can be a process that starts, stops and monitors applications (e.g., application 108) on mobile device 100. In some implementations, application manager 106 can report start and stop times for applications running on mobile device 100 to sampling daemon 102. For example, when a user or other process invokes or launches an application, application manager 106 can notify sampling daemon 102 of the application invocation. Additionally, application manager 106 can indicate to sampling daemon 102 that the application launch is initiated in response to a push notification, user invocation or a predicted or forecasted user application invocation. When an application terminates, application manager 106 can notify sampling daemon 102 that the application is no longer running. The application manager 106 can provide the name or other identifier of the application and the start time or end time to sampling daemon 102, for example.

In some implementations, sampling daemon 102 can use the application start and end notifications to generate a history of usage times per application. For example, the history of usage times per application can include for each execution of an application an amount of time that has passed since the last execution of the application and execution duration. Sampling daemon 102 can maintain a separate history of user invoked application launches and/or system launched applications. Thus, sampling daemon 102 can maintain usage statistics for all applications that are run on mobile device 100.

In some implementations, sampling daemon 102 can receive power statistics from power monitor process 108. For example, power monitor 108 can monitor battery capacity, discharge, usage, and charging characteristics for mobile device 100. Power monitor can determine when the mobile device 100 is plugged into external power sources and when the mobile device 100 is on battery power. Power monitor 108 can notify sampling daemon 102 when the mobile device 100 is plugged into external power. For example, power monitor 108 can send a message to sampling daemon 102 when power monitor detects that mobile device 100 is plugged into an external power source. The message can include the battery charge at the time when the external power source is connected.

Power monitor 108 can notify sampling daemon 102 when the mobile device 100 is disconnected from external power. For example, power monitor 108 can send a message to sampling daemon 102 when power monitor detects that mobile device 100 is disconnected from an external power source. The message can include the battery charge at the time when the external power source is disconnected. Thus, sampling daemon 102 can maintain statistics describing the charging distribution (e.g., charge over time) of the batteries of the mobile device 100. The charging distribution statistics can include an amount of time since the last charge (e.g., time since plugged into external power) and the change in battery charge attributable to the charging (e.g., start level of charge, end level of charge).

In some implementations, power monitor 108 can notify sampling daemon 102 of changes in battery charge throughout the day. For example, power monitor 108 can be notified when applications start and stop and in response to the notifications, determine the amount of battery power discharged during the period and the amount of charge remaining in the battery and transmit this information to sampling daemon 102.

In some implementations, sampling daemon 102 can receive device temperature statistics from thermal management process 110. For example, thermal management process 110 can monitor the operating temperature conditions of the mobile device 100 using one or more temperature sensors. Thermal management process 110 can be configured to periodically report temperature changes to sampling daemon 102. For example, thermal management process 110 can determine the operating temperature of mobile device 100 every five seconds and report the temperature to sampling daemon 102. Sampling daemon 102 can store the reported temperatures in event data store 104.

In some implementations, sampling daemon 102 can receive device settings statistics from device settings process 112. For example, device settings process 112 can be a function or process of the operating system of mobile device 100. Device settings process 112 can, for example, receive user input to adjust various device settings, such as turning on/off airplane mode, turning on/off Wi-Fi, turning on/off roaming, etc. Device settings process 112 can report changes to device settings to sampling daemon 102. For example, device settings process 112 can notify sampling daemon 102 when the user turns on or off airplane mode on the mobile device 100. Sampling daemon 102 can generate and store statistics for the device settings based on the received notifications. For example, for each time a setting is enabled (or disabled), sampling daemon 102 can store data that indicates the amount of time that has passed since the setting was previously enabled and the amount of time (e.g., duration) that the setting was enabled.

Similarly, in some implementations, sampling daemon 102 can receive notifications from other mobile device 100 components (e.g., device sensors 114) when other events occur. For example, sampling daemon 102 can receive notifications when the mobile device's idle screen is turned on or off, when the mobile device 100 is held next to the user's face, when a cell tower handoff is detected, when the baseband processor is in a search mode, when the mobile device 100 has detected that the user is walking, running and/or driving. In each case, the sampling daemon 102 can receive a notification at the start and end of the event. In each case, the sampling daemon 102 can generate and store statistics indicating the amount of time that has passed since the event was last detected and the duration of the event. The sampling daemon 102 can receive other event notifications and generate other statistics as described further below with respect to specific use cases and scenarios.

Application Events

In some implementations, sampling daemon 102 can receive event information from applications on mobile device 100. For example, sampling daemon 102 can receive calendar events (e.g., appointments, meetings, reminders, etc.) from calendar application 116. Sampling daemon 102 can store the event name, event duration and/or time when the event is scheduled to occur, for example. Sampling daemon 102 can receive clock events from clock application 118. For example, sampling daemon 102 can store the event name (e.g., alarm name) and/or time when the event is scheduled to occur. Sampling daemon 102 can receive event information from other applications (e.g., media application, passbook application, etc.) as described further below.

Application Statistics

In some implementations, sampling daemon 102 can collect application statistics across application launch events. For example, sampling daemon 102 can collect statistics for each application across many invocations of the application. For example, each application can be identified with a hash of its executable's filesystem path and the executable's content's hash so that different versions of the same application can be handled as distinct applications.

In some implementations, sampling daemon 102 can maintain a counter that tracks background task completion assertion events for each application. For example, each time an application is run as a background task (e.g., not visible in the foreground and/or currently in use by the user) the application or application manager 106 can notify sampling daemon 102 when the application is terminated or is suspended and the sampling daemon 102 can increment the counter. Sampling daemon 102 can maintain a counter that tracks the cumulative number of seconds across application launches that the application has run in the background. In some implementations, sampling daemon 102 can maintain separate counters that count the number of data connections, track the amount of network data traffic (e.g., in bytes), track the duration and size of filesystem operations and/or track the number of threads associated with each application. Sampling daemon 102 can maintain a count of the cumulative amount of time an application remains active across application launches, for example. These are just a limited example of the types of application statistics that can be tracked by sampling daemon 102. Other statistics can be generated or collected as described further below.

Heuristics

In some implementations, mobile device 100 can be configured with heuristic processes that can adjust settings of device components based on events detected by sampling daemon 102. For example, heuristic processes 120 can include one or more processes that are configured (e.g., programmed) to adjust various system settings (e.g., CPU power, baseband processor power, display lighting, etc.) in response to one or more trigger events and/or based on the statistics collected or generated by sampling daemon 102.

In some implementations, heuristic process 120 can register with sampling daemon 102 to be invoked or activated when a predefined set of criteria is met (e.g., the occurrence of some trigger event). Trigger events might include the invocation of a media player application or detecting that the user has started walking, running, driving, etc. The trigger event can be generalized to invoke a heuristic process 120 when some property, data, statistic, event, etc. is detected in event data 104 or by sampling daemon 102. For example, a heuristic process 120 can be invoked when sampling daemon 102 receives an application start notification or a temperature above a certain threshold value. A heuristic process 120 can register to be invoked when a single event occurs or statistic is observed. A heuristic process 120 can register to be invoked when a combination of events, data and/or statistics are observed or detected. Heuristic process 120 can be triggered or invoked in response to specific user input (e.g., changing a device setting to airplane mode). When sampling process 102 detects the events for which a heuristic process 120 registered, sampling process 102 can invoke the heuristic process 120.

In some implementations, when a heuristic process 120 is invoked, the heuristic process 120 can communicate with sampling daemon 102 to retrieve data from event data 104. The heuristic process 120 can process the event data and/or other data that the heuristic process 120 collects on its own to determine how to adjust system settings to improve the performance of mobile device 100, improve the user's experience while using mobile device 100 and/or avert future problems with mobile device 100.

In some implementations, heuristic process 120 can make settings recommendations that can cause a change in the settings of various device components 122 of mobile device 100. For example, device components can include CPU, GPU, baseband processor, display, GPS, Bluetooth, Wi-Fi, vibration motor and other components.

In some implementations, heuristic process 120 can make settings recommendations to control multiplexer 124. For example, control multiplexer 124 can be a process that arbitrates between component settings provided by heuristic processes 120 and other processes and/or functions of mobile device 100 that influence or change the settings of the components of mobile device 100. For example, thermal management process 110 can be configured to make adjustments to CPU power, display brightness, baseband processor power and other component settings based on detecting that the mobile device 100 is in the middle of a thermal event (e.g., above a threshold temperature). However, a heuristic process 120 can be configured to make adjustments to CPU power, display brightness, baseband processor power and other component settings as well. Thus, in some implementations, heuristic process 120 and thermal management process 110 can make settings adjustment recommendations to control multiplexer 124 and control multiplexer 124 can determine which settings adjustments to make. For example, control multiplexer 124 can prioritize processes and perform adjustments based on the priority of the recommending process. Thus, if thermal management process 110 is a higher priority process than heuristic process 120, control multiplexer 124 can adjust the settings of the CPU, display, baseband processor, etc. according to the recommendations of thermal management process 110 instead of heuristic process 120.

In some implementations, a mobile device 100 can be configured with multiple heuristic processes 120. The heuristic processes 120 can be configured or reconfigured over the air. For example, the parameters (e.g., triggers, threshold values, criteria, and output) of each heuristic process 120 can be set or adjusted over the network (e.g., cellular data connection, Wi-Fi connection, etc.). In some implementations, new heuristic processes 120 can be added to mobile device 100. For example, over time new correlations between trigger events, statistical data and device settings can be determined by system developers. As these new correlations are identified, new heuristic processes 120 can be developed to adjust system settings to account for the newly determined relationships. In some implementations, new heuristic processes 120 can be added to mobile device 100 over the network. For example, the new heuristic processes 120 can be downloaded or installed on mobile device 100 over the air (e.g., cellular data connection, Wi-Fi connection, etc.).

Example Heuristic Processes

In some implementations, a heuristic process 120 can be configured to adjust system settings of the mobile device 100 to prevent the mobile device 100 from getting too hot when in the user's pocket. For example, this hot-in-pocket heuristic process can be configured to register with sampling daemon 102 to be invoked when the mobile device's display is off and when the mobile device 100 is not playing any entertainment media (e.g., music, movies, video, etc.). When invoked, the hot-in-pocket heuristic can make recommendations to reduce CPU power and GPU power, for example.

In some implementations, a heuristic process 120 can be configured to adjust location accuracy when the mobile device's display is not being used. For example, if the mobile device's display is not being used (e.g., the display is turned off), the mobile device 100 cannot display map information or directions to the user. Thus, the user is not likely using the location services of the mobile device 100 and the location services (e.g., GPS location, Wi-Fi location, cellular location, etc.) can be adjusted to use less power. The location accuracy heuristic process can register with sampling daemon 102 to be invoked when the mobile device's display is off. When invoked, the heuristic process can adjust the power levels of the GPS processor, Wi-Fi transmitter, cellular transmitter, baseband processor or terminate processes used to determine a location of the mobile device 100.

In some implementations, a heuristic process 120 can be configured to adjust the settings of the mobile device's ambient light sensor in response to the user's behavior. For example, this user-adaptive ambient light sensor (ALS) heuristic process can be invoked by sampling daemon 102 when sampling daemon 102 receives data indicating that the ambient light sensor has detected a change in the ambient light surrounding mobile device 100, that the ambient light sensor system has adjusted the brightness of the display and/or that the user has provided input to adjust the brightness of the display.

When invoked, the user-adaptive ALS heuristic can request additional information from sampling daemon 102 with respect to ALS display adjustments and user initiated display adjustments to determine if there is a pattern of user input that indicates that when the ALS adjusts the display brightness up or down and the user adjusts the display brightness in the opposite direction. For example, the user may ride the bus or the train to work. The bus lights may be turned on and off during the ride. The ambient light sensor can detect the change in ambient light and increase the display brightness when the lights come on. Since the lights only come on temporarily, the user may decrease the display brightness when the lights turn off again. This pattern of user input can be correlated to time of day, calendar or alarm entry, or travel pattern by the heuristic process to determine under what circumstances or context the user adjusts the display brightness in response to an ALS display adjustment. Once the user-adaptive ALS heuristic process determines the pattern of input and context, the heuristic process can adjust the settings of the ALS to be more or less aggressive. For example, the ALS can be adjusted to check the level of ambient light more or less frequently during the determined time of day, calendar or alarm entry, or travel pattern and adjust the display brightness accordingly.

The above heuristic processes are a few examples of heuristic processes and how they might be implemented in the system described herein. Other heuristic processes can be implemented and added to the system as they are developed over time. For example, additional heuristic processes can be configured or programmed to adjust CPU, GPU, baseband processors or other components of the mobile device in response to detecting events or patterns of events related to temperature measurements, user input, clock events (e.g., alarms), calendar events and/or other events occurring and detected on the mobile device.

Example Heuristic Registration and Invocation Processes

Figure 2:
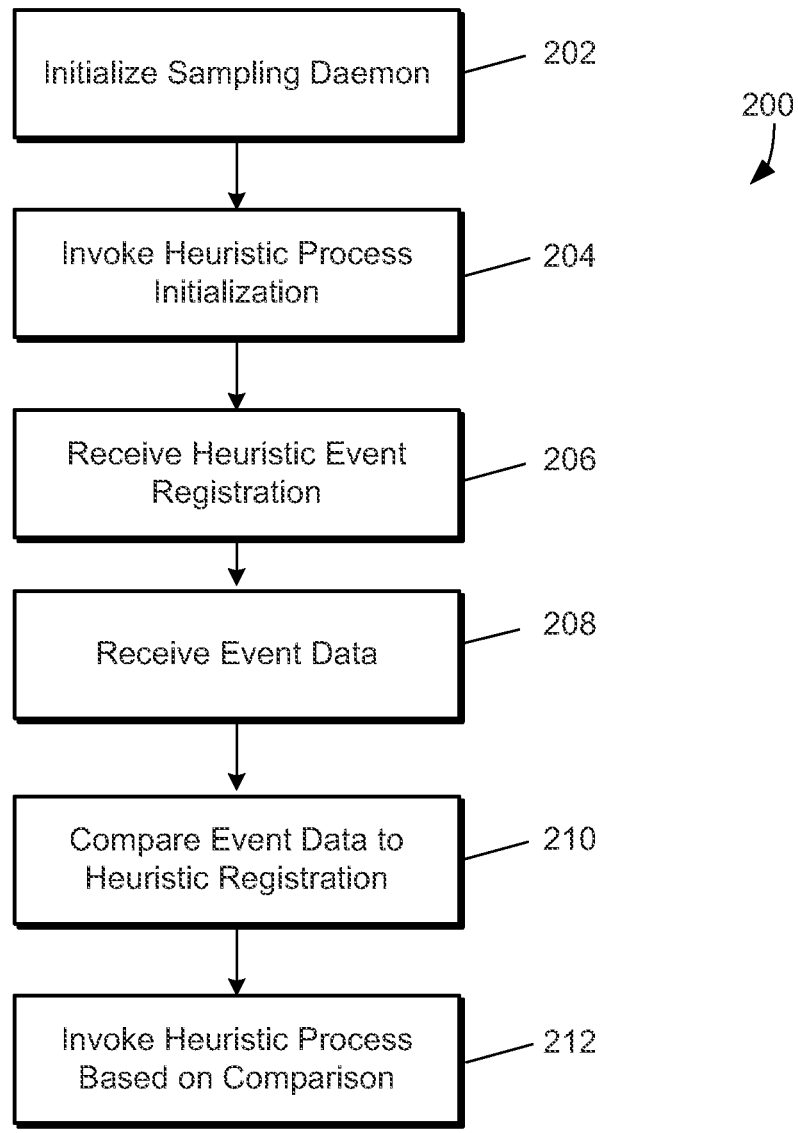
FIG. 2 illustrates an example process for invoking heuristic processes.

FIG. 2 illustrates an example process 200 for invoking heuristic processes. At step 202, the sampling daemon 102 can be initialized. For example, sampling daemon 102 can be initialized during startup of the mobile device 100.

At step 204, the sampling daemon 102 can invoke the heuristic processes configured on the mobile device 100 during initialization of the sampling daemon 102. For example, sampling daemon 102 can cause each heuristic process 120 to execute on mobile device 100 and run through their initialization subroutines.

At step 206, the sampling daemon 102 can receive event registration messages from each heuristic process 120. For example, during the initialization subroutines of the heuristic processes 120, the heuristic processes 120 can send information to sampling daemon 102 indicating which events should trigger an invocation of heuristic processes 120. Sampling daemon 102 can store the registration information in a database, such as event data store 104, for example. For example, the registration information can include an identification of the heuristic process (e.g., executable name, file system path, etc.) and event criteria (identification of events, values, threshold, ranges, etc.).

At step 208, the sampling daemon 102 can receive event data. For example, sampling daemon 102 can receive event data from various system components, including the application manager 106, sensors 114, calendar 116 and clock 118, as described above.

At step 210, the sampling daemon 102 can compare the received event data to the heuristic registration data. For example, as event data is reported to sampling daemon 102, sampling daemon 102 can compare the event data, or the statistics generated from the event data, to the registration information received from the heuristic processes 120.

At step 212, the sampling daemon 102 can invoke a heuristic process based on the comparison performed at step 210. For example, if the event data and/or statistics, meet the criteria specified in the heuristic registration data for a heuristic process 120, then the sampling daemon 102 can invoke the heuristic process 120. For example, if the event data and/or statistics data cross some threshold value specified for an event by the heuristic process during registration, then the heuristic process can be invoked by sampling daemon 102.

Figure 3:
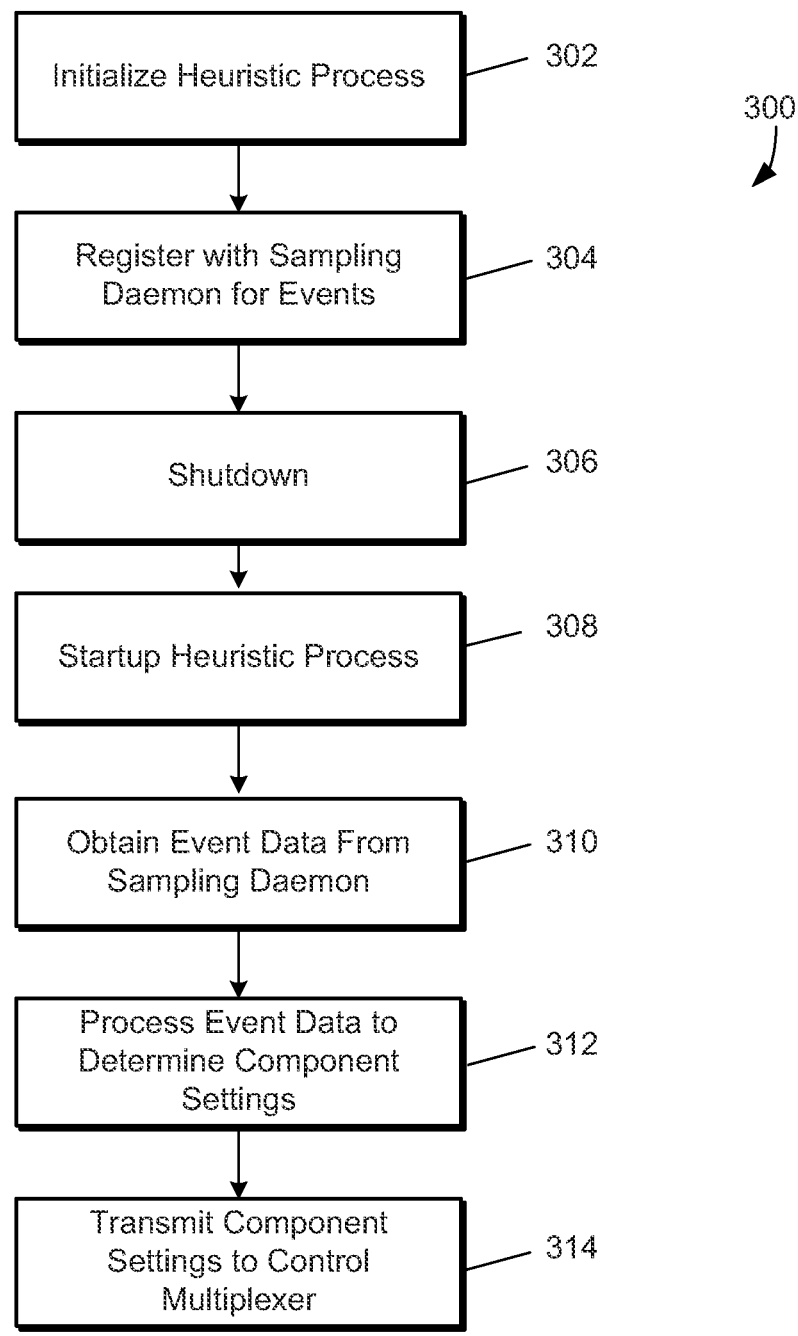
FIG. 3 illustrates a process for adjusting the settings of a mobile device using a heuristic process.

FIG. 3 illustrates a process 300 for adjusting the settings of a mobile device 100 using a heuristic process 120. At step 302, the heuristic process 120 is initialized. For example, the heuristic process 120 can be invoked by sampling daemon 102 so that the heuristic process 120 can run through its initialization subroutines. For example, the invocation can be parameterized to indicate that the heuristic process 120 should run through its initialization subroutines during this invocation.

At step 304, the heuristic process 120 can register with sampling daemon 102 for system events. For example, during initialization, the heuristic process 120 can send a message to sampling daemon 102 that includes an identification of events, thresholds, values or other criteria for invoking the heuristic process 120. When the event occurs and/or the criteria are met, sampling daemon 102 can invoke the heuristic process 120.

At step 306, the heuristic process 120 can shut down or terminate. For example, the heuristic process 120 is not needed by the system until the registration criteria are met for the heuristic process 120. Thus, to conserve device resources (e.g., battery power, processing power, etc.), the heuristic process 120 is terminated, shutdown or suspended until it is needed.

At step 308, the heuristic process 120 can be restarted. For example, sampling daemon 102 can invoke the heuristic process 120 when sampling daemon 102 determines that the criteria specified by the heuristic process 120 in the registration message have been met.

At step 310, the heuristic process 120 can obtain event data from sampling daemon 102. For example, once restarted, the heuristic process 120 can query sampling daemon 102 for additional event data. The heuristic process 120 can be configured to interact with other system resources, processes, sensors, etc. to collect data, as needed.

At step 312, the heuristic process 120 can process event data to determine component settings. For example, the heuristic process 120 can use the event data and/or statistics from the sampling daemon 102 and/or the data collected from other components of the system to determine how to adjust the settings of various components of the mobile device 100.

At step 314, the heuristic process 120 can transmit the determined component settings to the control multiplexer 124. For example, the control multiplexer 124 can arbitrate device settings recommendations received from the heuristic process 120 and other system components (e.g., thermal management process 110). The control multiplexer 124 can then adjust various components (e.g., CPU, GPU, baseband processor, display, etc.) of the mobile device 100 according to the received settings recommendations.

Keep Applications Up to Date—Fetching Updates

Figure 4:
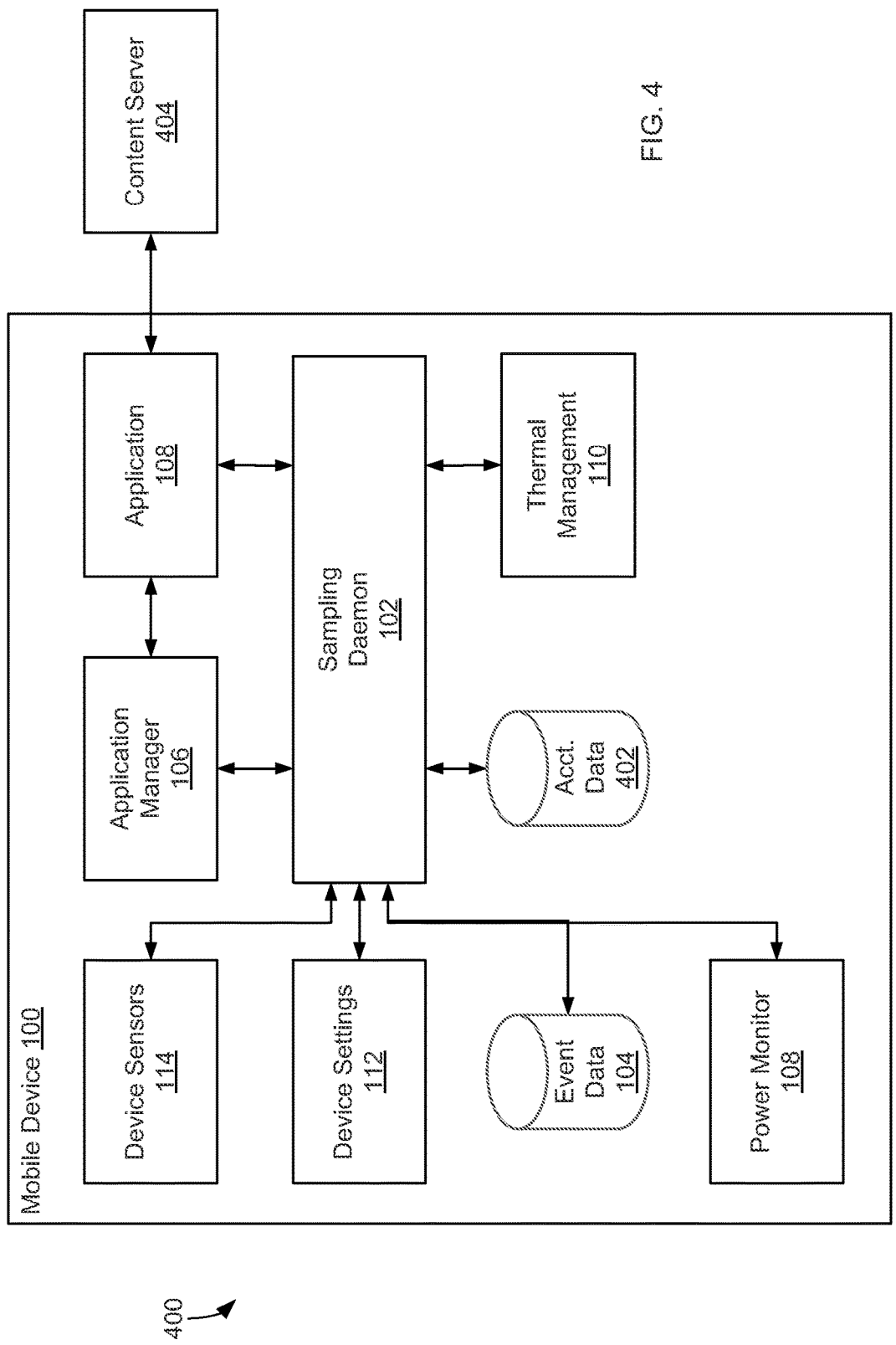
FIG. 4 illustrates an example system for performing background fetch updating of applications.

FIG. 4 illustrates an example system 400 for performing background fetch updating of applications. In some implementations, mobile device 100 can be configured to predictively launch applications as background processes of the mobile device 100 so that the applications can download content and update their interfaces in anticipation of a user invoking the applications. For example, the user application launch history data maintained by sampling daemon 102 can be used to forecast when the user will invoke applications of the mobile device 100. These applications can be launched by the application manager 106 prior to user invocation so that the user will not be required to wait for a user invoked application to download current content and update the graphical interfaces of the applications.

Determining when to Launch Applications

In some implementations, application manager 106 can request an application invocation forecast from sampling daemon 102. For example, sampling daemon 102 can provide an interface that allows the application manager 106 to request information that indicate when to launch applications of the mobile device 100. Sampling daemon 102 can maintain statistics that indicate when the user invokes applications on the mobile device 100, as described above. When application manager 106 calls the "when to launch" interface, sampling daemon 102 can process the user application invocation statistics to determine when during the day each application is typically invoked by the user. For example, sampling daemon 102 can calculate a probability that a particular time of day or time period will include an application invocation by a user.

In some implementations, application manager 106 can invoke the "when to launch" interface of sampling daemon 102 during initialization of the application manager 106. For example, application manager 106 can be invoked or launched during startup of mobile device 100. While application manager 106 is initializing, application manager 106 can request a forecast of application invocations for the next 24 hours. Once the initial 24 hour period has passed, application manager 106 can request another 24 hour forecast. This 24 forecast cycle can continue until the mobile device 100 is turned off, for example.

In some implementations, sampling daemon 102 can generate an application invocation forecast for a 24 hour period. For example, sampling daemon 102 can divide the 24 hour period into 96 fifteen minute timeslots. Sampling daemon 102 can determine which applications have been invoked and at what time the applications were invoked over a number (e.g., 1 to 7) of previous days of operation based on the application launch history data collected by sampling daemon 102 and stored in event data store 104. In some implementations, sampling daemon 102 will exclude an application from the invocation forecast when background updates have been disabled for the application.

In some implementations, each 15 minute timeslot can be ranked according to a probability that an (e.g., any) application will be invoked in the 15 minute timeslot. For example, if the sampling daemon 102 is using the previous seven days of user invoked application launch history data to determine the probabilities for the 15 minute timeslots, sampling daemon 102 can calculate how many user invoked application launches occurred over the previous seven days (e.g., total app launches) and determine how many application launches occurred within each 15 minute timeslot (e.g., n timeslot). For example, if a 15 minute window corresponds to the time period 12:00 pm-12:15 pm, then the number of applications launched within the 15 minute window will include all user initiated application launches occurring from 12:00 pm-12:15 pm on each of the last seven days. Sampling daemon 102 can then determine the probability of an application being invoked by a user within a given 15 minute timeslot by dividing the number of application launches occurring within a given 15 minute window of each of the seven days by the total application launches over the seven day period (e.g., n timeslot/total app launches).

Once the application invocation probabilities for each of the 96 timeslots is calculated, sampling daemon 102 will select a number (e.g., up to 64) of the timeslots having the largest non-zero probabilities and return information identifying the timeslots to application manager 106. For example, sampling daemon 102 can send application manager 106 a list of times (e.g., 12:00 pm, 1:45 pm, etc.) that correspond to the start of 15 minute timeslots that correspond to probable user invoked application launches.

In some implementations, each of the 96 timeslots can be ranked based on recurring application invocations within each respective timeslot. For example, a timeslot can be highly ranked if a user invokes the same application in the same timeslot during each day over the last number (e.g., seven) of days. A timeslot can be lowly ranked if a user invoked different applications (e.g., the same application is not invoked more than once) in the same timeslot during each day over the last number of days. For example, if during a timeslot (e.g., 12:00-12:15 pm) for the last seven days, application 'A' is invoked by the user, the timeslot can have a ranking or a score based on the ratio of days the application is invoked over the total number of days considered (e.g., 7/7=1). If during a timeslot (e.g., 12:00-12:15 pm) for the last seven days, application 'B' is invoked by the user on only one day, then the timeslot can have a ranking or score based on the ratio of days the application is invoked over the total number of days considered (e.g., 1/7=0.14). If application A and application B are invoked in the 12:00-12:15 pm timeslot over the seven day period, then the timeslot can be ranked or scored according to the highest score generated. For example, the score for the timeslot using application A is 1.0, the score for the timeslot using application B is 0.14, thus, the score for the timeslot is 1.0. Timeslots having no application invocations can be assigned a score of zero.

In some implementations, sampling daemon 102 can select a number (e.g., 64) of timeslots having the highest score and send them to application manager 106. For example, sampling daemon 102 can send application manager 106 a list of times (e.g., 12:00 pm, 1:45 pm, etc.) that correspond to the start of 15 minute timeslots that correspond to probable user invoked application launches.

In some implementations, application manager 106 can set timers based on the timeslots provided by sampling daemon 102. For example, application manager 106 can create or set one or more timers (e.g., alarms) that correspond to the timeslots identified by sampling daemon 102. When each timer goes off (e.g., at 12:00 pm), application manager 106 can wake (e.g., if sleeping, suspended, etc.) and determine which applications should be launched for the current 15 minute timeslot. Thus, the timers can trigger a fetch background update for applications that are likely to be invoked by a user within the corresponding timeslot.

In some implementations, other events can trigger a fetch background update for applications. For example, turning on a cellular radio, baseband processor or establishing a network connection (e.g., cellular or Wi-Fi) can trigger a background application launch so that the application update can take advantage of an active network connection. Unlocking the mobile device 100, turning on the display and/or other interactions can trigger a background application launch and fetch update, as described further below. In some implementations, application manager 106 will not trigger a background application launch and fetch update if any background updates were performed within a previous number (e.g., seven) of minutes.

Determining What Applications to Launch

In some implementations, application manager 106 can request that sampling daemon 102 provide a list of applications to launch for the current times. For example, when a timer goes off (e.g., expires) for a 15 minute timeslot, application manager can call a "what to launch" interface of sampling daemon 102 so that sampling daemon 102 can determine which applications to launch for the current timeslot. Sampling daemon 102 can then generate a list of applications and corresponding scores indicating the probability that each application will be invoked by the user at about the current time, as described further below. In some implementations, sampling daemon 102 will exclude an application from the list of applications when background updates have been disabled for the application.

In some implementations, sampling daemon 102 can determine the probability that each application will be invoked by a user for a current (e.g., 15 minute) timeslot. For example, in response to an invocation of the "what to launch" interface, sampling daemon 102 can determine the likelihood that each application will be invoked by the user.

Figure 5:
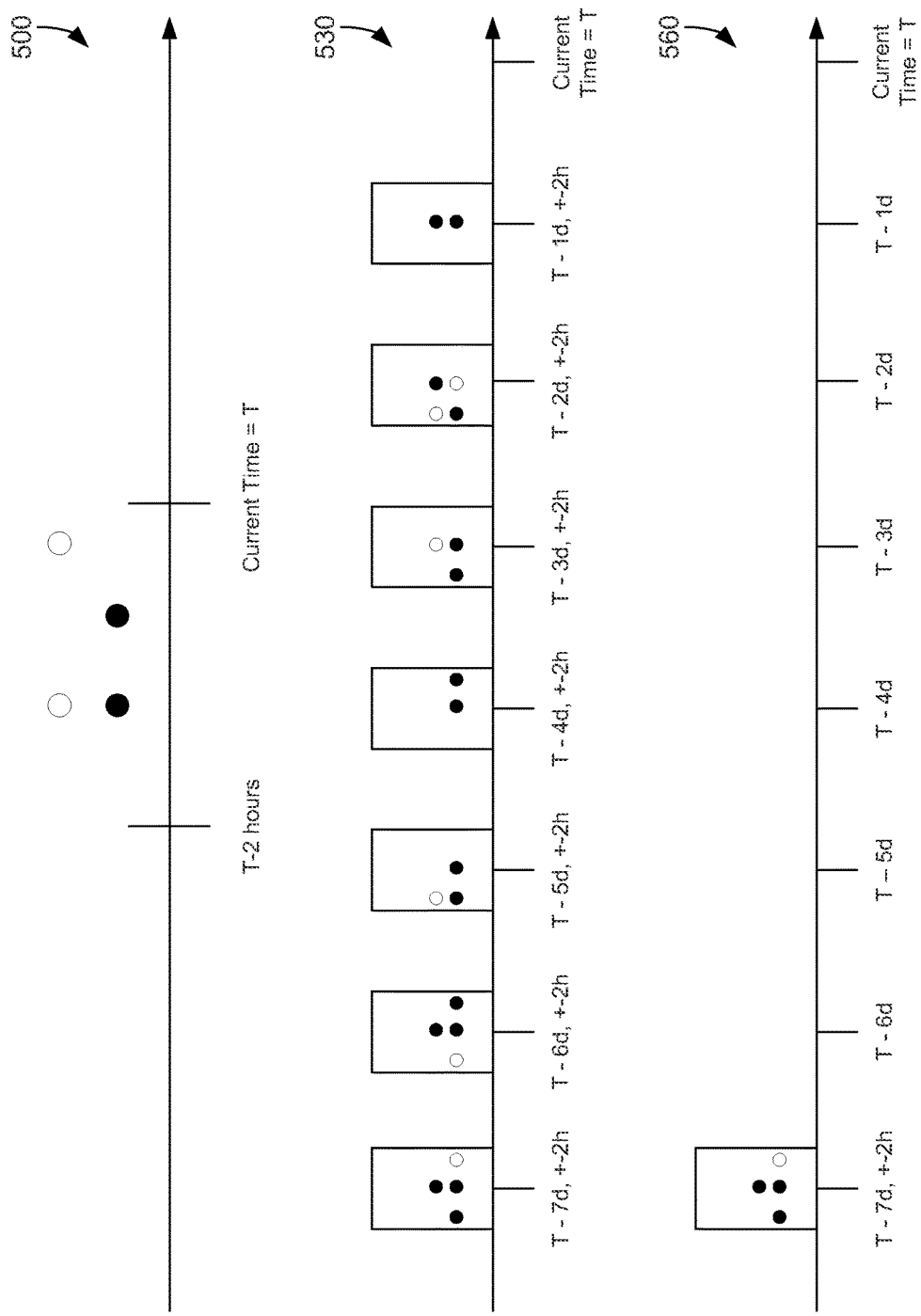
FIG. 5 illustrates example diagrams depicting time series modeling for determining user invocation probabilities for applications on mobile device.

FIG. 5 illustrates example diagrams 500, 530 and 560 depicting time series modeling for determining user invocation probabilities for applications on mobile device 100. In some implementations, sampling daemon 102 can use time series modeling to determine the user invocation probabilities for each application on mobile device 100. If an application does not show up in the time series, the application can be assigned a zero probability value.

In some implementations, user invocation probabilities can be generated based on recent application invocations. For example, user invocation probabilities can be generated using application launch data for the previous two hours (e.g., user initiated application launches within the last two hours). As illustrated by diagram 500, application launch history data can indicate a number (e.g., four) of applications were launched in the previous two hours. For example, the dots and circles can represent applications where the empty circles can represent a single particular application (e.g., email, social networking application, etc.). The probability associated with the particular application using recent history can be calculated by dividing the number of invocations of the particular application (e.g., 2) by the total number of application invocations (e.g., 4) within the previous two hours. In the illustrated case, the probability associated with the particular application using recent application launch history data is 2/4 or 50%.

User invocation probabilities can be generated based on a daily history of application launches (e.g., which applications were launched at the current time +−2 hours for each of the previous seven days). Diagram 530 represents using a daily history to determine a user invocation probability for an application. For example, each box of diagram 530 represents time windows (e.g., current time +−2 hours) in each of a number (e.g., 7) of previous days that can be analyzed to determine the user invocation probability for a particular application (e.g., empty circle). The probability associated with the particular application using daily history data can be calculated by dividing the number of invocations of the particular application in all windows (e.g., 6) by the total number of application invocations in all windows (e.g., 22). In the illustrated case, the probability associated with the particular application using daily launch history data is 6/22 or 27%.

User invocation probabilities can be generated based on a weekly history of application launches (e.g., which applications were launched at the current time +−2 hours seven days ago). Diagram 560 represents using a weekly history to determine a user invocation probability for an application. For example, if the current day and time is Wednesday at 1 pm, the user invocation probability for an application can be based on applications launched during the previous Wednesday during a time window at or around 1 pm (e.g., +−2 hours). In the illustrated case, the probability associated with the particular application (e.g., empty circle) using weekly application launch history data is 1/4 or 25%.

In some implementations, the recent, daily and weekly user invocation probabilities can be combined to generate a score for each application. For example, the recent, daily and weekly probabilities can be combined by calculating a weighted average of the recent (r), daily (d) and weekly (w) probabilities. Each probability can have an associated weight and each weight can correspond to an empirically determined predefined importance of each probability. The sum of all weights can equal one. For example, the weight for probability based on recent launches can be 0.6, the weight for the daily probability can be 0.3, and the weight for the weekly probability can be 0.1. Thus, the combined probability score can be the sum of 0.6(r), 0.3(d) and 0.1(w) (e.g., score=0.6r+0.3d+0.1w).

Referring back to FIG. 4, once the probability score is determined for each application based on the recent, daily and weekly probabilities, the sampling daemon 102 can recommend a configurable number (e.g., three) of applications having the highest non-zero probability scores to the application manager 106 for launching to perform background fetch downloads/updates.

In some implementations, sampling daemon 102 can exclude from the "what to launch" analysis described above applications that do not support background updates (e.g., fetching) application updates, applications where the user has turned off background updates, applications that have opted out of background updates, and/or whichever application is currently being used by the user or is in the foreground on the display of the mobile device 100 since it is likely that the foreground application is already up to date.

Determining that it is Ok to Launch an Application

In some implementations, when application manager 106 receives the list of applications to launch and application scores, application manager 106 can call an "ok to launch" interface of sampling daemon 102 to determine if it is ok to launch each application. For example, sampling daemon 102 can analyze network conditions, device conditions, environmental conditions, data and energy budgets and other data to determine if it is ok for application manager 106 to launch a particular application. Application manager 106 can send sampling daemon 102 an application identifier when calling the "ok to launch" interface, for example.

In some implementations, other applications on mobile device 102 can call the "ok to launch" interface of sampling daemon 102 to determine whether it is ok to launch an application in the background of mobile device 100. For example, the push service daemon described below can invoke the "ok to launch" interface to determine if it is ok to launch applications in response to receiving a push notification. In some implementations, sampling daemon 102 will return a "no" reply value when background updates have been disabled for an application identified in an "ok to launch" request.

Environmental Conditions

In some implementations, sampling daemon 102 can determine whether to allow launching the identified application based on the environmental conditions of the mobile device 100. For example, environmental conditions can include the current state of the mobile device 100, the state of network connections and/or other conditions as described below. In some implementations, when the "ok to launch" interface is called by application manager 106 (or another application, process or daemon), sampling daemon 102 can return values indicating that it is "never" ok to launch the identified application, "no" it is not ok to launch the application, or "yes" it is ok to launch the application. For example, a "yes" value will be returned unless one of the conditions below indicates that the application should not be launched. Sampling daemon 102 will return a "never" value when the identified application has not been recently used (e.g., not used in the past 8 weeks), when the user has disabled the application and/or when the application was explicitly closed by the user.

In some implementations, sampling daemon 102 can indicate that application manager 106 should not launch an application when the mobile device 100 is connected to a voice call and not connected to a Wi-Fi network connection. For example, to prevent background updating processes (e.g., fetch processes) from interfering with or reducing the quality of voice calls, the sampling daemon 102 will not allow application manager 106 to launch a background updating process when the user is connected to a voice call and not connected to a Wi-Fi connection. Thus, sampling daemon 102 will return a "no" value in response to an "ok to launch" request when the mobile device 100 is connected to a call and not connected to Wi-Fi.

In some implementations, sampling daemon 102 can indicate that application manager 106 should not launch an application when the mobile device 100 has detected a thermal event. For example, the thermal management process 110 can monitor the temperature of the mobile device 100 and report temperature values to sampling daemon 102. When sampling daemon 102 determines that the temperature of mobile device 100 is above a threshold temperature value, sampling daemon 102 can prevent application manager 106 from launching additional applications that may increase the operating temperature of mobile device 100 further by returning a "no" value when application manager makes an "ok to launch" request.

In some implementations, sampling daemon 102 can indicate that application manager 106 should not launch an application when the mobile device 100 has a poor quality cellular network connection. A poor quality cellular connection can be determined when transfer rate and/or throughput are below predefined threshold values. For example, if the mobile device 100 has a poor quality cellular network connection and is not connected to Wi-Fi, the sampling daemon 102 can prevent application manager 106 from launching an application that will waste battery energy and cellular data by attempting to download or upload data over a poor cellular connection by returning a "no" value when application manager makes an "ok to launch" request.

In some implementations, sampling daemon 102 can indicate that application manager 106 should not launch an application when mobile device 100 is using more than a threshold amount (e.g., 90%) of memory resources. For example, if mobile device 100 is already running many applications or processes that are using most of the memory resources of the mobile device 100, launching additional applications in the background will only reduce the performance of the mobile device 100 by using up remaining memory resources. Thus, when sampling daemon 102 determines that memory usage exceeds a threshold value (e.g., 75%), sampling daemon 102 can prevent application manager 106 from launching additional applications by returning a "no" value when application manager makes an "ok to launch" request.

In some implementations, sampling daemon 102 can indicate that application manager 106 should not launch an application when an application has opted out of background updates or a user has turned off background updates for an application. For example, an application can programmatically (e.g., dynamically) determine (based on programmer defined criteria) that the application should opt out of background updates for a period of time. Alternatively, a user can interact with a settings user interface to turn off background updates for an application. In either case, sampling daemon 102 can determine that background updates have been disabled for the application and prevent application manager 106 from launching the application by returning a "no" value when application manager 106 makes an "ok to launch" request for an application.

Accounting for Budgets and Rate Limits

In some implementations, sampling daemon 102 can determine whether it is ok to launch an application based on an energy budget, a data budget and/or application launch rate limits configured for mobile device 100. Sampling daemon 102 can store budget and rate limit information in accounting data store 402, including counters for keeping track of remaining data and energy budgets for the current time period (e.g., current hour).

Energy Budget

In some implementations, sampling daemon 102 can determine whether it is ok to launch an application based on an energy budget. For example, the energy budget can be a percentage (e.g., 5%) of the capacity of the mobile device's battery in milliamp hours. The energy budget can be divided between predictive fetch applications (e.g., 2%), as described above, and push applications and background download/upload (e.g., 3%), as described below.

In some implementations, the energy budgets can be distributed among each hour in a 24 hour period. For example, sampling daemon 102 can utilize the battery charging statistics collected and stored in event data store 104 to determine a distribution that reflects a typical historical battery usage for each hour in the 24 hour period. For example, each hour can be assigned a percentage of the energy budget based on the historically or statistically determined energy use distribution or application usage forecast, as described above. Each hour will have at least a minimum amount of energy budget that is greater than zero (e.g., 0.1%, 1%, etc.). For example, 10% of the energy budget can be distributed among hours with no use data and the remaining 90% of the energy budget can be distributed among active use hours according to historical energy or application use. As each hour passes, the current energy budget will be replenished with the energy budget for the new/current hour. Any energy budget left over from a previous hour will be added to the current hour's budget.

In some implementations, accounting data store 402 can include a counter for determining how much energy budget remains for fetch applications (e.g., predictively launched applications). For example, accounting data store 402 can include one or more counters that are initialized with the energy budgets (e.g., fetch budget, push and background download/upload) for the current hour. When the energy budget is used by an application, the corresponding (e.g., fetch or push) energy budget can be decremented by a corresponding amount. For example, application manager 106 can notify sampling daemon 102 when an application is launched or terminated. In turn, sampling daemon 102 can notify power monitor 108 when an application is launched and when the application is terminated. Based on the start and stop times, power monitor 108 can determine how much energy was used by the application. Power monitor 108 can transmit the amount of power used by the application to sampling daemon 102 and sampling daemon 102 can decrement the appropriate counter by the amount of power used.

In some implementations, when no energy budget remains for the current hour, sampling daemon 102 can respond with a "no" reply to an ok to launch request. For example, when the energy budget counters in accounting data store 402 are decremented to zero, no energy budget remains and no additional background applications will be launched.

In some implementations, sampling daemon 102 will not base an "ok to launch" determination on the energy budget when the mobile device 100 is plugged into external power. For example, a remaining energy budget of zero will not prevent applications from launching when the mobile device 100 is plugged into an external power source.

Data Budget

In some implementations, sampling daemon 102 can determine whether it is ok to launch an application based on a data budget. For example, sampling daemon 102 can determine an average amount of network data consumed by the mobile device 100 based on statistical data collected by sampling daemon 102 and stored in event data store 104. The network data budgets (e.g., fetch/push budget, background download/upload budget) can be calculated as a percentage of average daily network data consumed by the user/mobile device 100. Alternatively, the network data budgets can be predefined or configurable values (e.g., 15 MB per day for fetch/push budget, 5 MB per day for background download/upload).

In some implementations, the network data budgets can be distributed among each hour in a 24 hour period. For example, each hour can be allocated a minimum budget (e.g., 0.2 MB). The remaining amount of the network data budget can be distributed among each of the 24 hours according to historical network data use. For example, sampling daemon 102 can determine based on historical statistical data how much network data is consumed in each hour of the day and assign percentages according to the amounts of data consumed in each hour. As each hour passes, the current data budget will be replenished with the data budget for the new/current hour. Any data budget left over from a previous hour will be added to the current hour's data budget.

In some implementations, accounting data store 402 can maintain data counters for network data budgets. For example, accounting data store 402 can maintain a data counter for fetch/push applications. Accounting data store 402 can maintain a data counter for background download/upload operations. As network data is consumed, the data counters can be decremented according to the amount of network data consumed. For example, the amount of network data consumed can be determined based on application start and stop times provided to sampling daemon 102 by application manager 106. Alternatively, the amount of network data consumed can be provided by the process utilizing the network interface (e.g., the background download/upload daemon described below).

In some implementations, sampling daemon 102 can keep track of which network interface (e.g., cellular or Wi-Fi) is used to consume network data and determine the amount of network data consumed based on the network interface. The amount of network data consumed can be adjusted according to weights or coefficients assigned to each interface. For example, network data consumed on a cellular data interface can be assigned a coefficient of one (1). Network data consumed on a Wi-Fi interface can be assigned a coefficient of one tenth (0.1). The total network data consumed can be calculated by adding the cellular data consumed to Wi-Fi data consumed divided by ten (e.g., total data=1*cellular data+0.1*Wi-Fi). Thus, data consumed over Wi-Fi will impact the data budget much less than data consumed over a cellular data connection.

In some implementations, when no data budget remains for the current hour, sampling daemon 102 can respond with a "no" reply to an ok to launch request. For example, when the data budget counters in accounting data store 402 are decremented to zero, no data budget remains and no additional background applications will be launched.

Global Application Launch Rate Limit

In some implementations, sampling daemon 102 can determine whether it is ok to launch an application based on a global application launch rate limit. For example, sampling daemon 102 can be configured with a number of background applications (e.g., fetch and/or push background applications) that application manager 106 can launch per hour. In some implementations, launch rate limits will only be considered for push notification triggered application launches, as described below. For example, application manager 106 can be limited to launching 64 background applications per hour. Sampling daemon 102 can maintain a counter that tracks the number of background application launches that have been performed in the current hour. Each hour the global application launch counter can be reset to allow more application launches. However, if the global application launch rate for the current hour is exceeded, then no additional background applications can be launched and sampling daemon 102 will return a "no" reply to an ok to launch request.

Per Application Launch Rate Limit

In some implementations, sampling daemon 102 can determine whether it is ok to launch an application based on an individual application launch rate limit. For example, sampling daemon 102 can be configured with a number times that individual background applications (e.g., fetch and/or push background applications) can be launched per hour. For example, application manager 106 can be limited to launching the same application 15 times per hour. Sampling daemon 102 can maintain a counter that tracks the number of times individual applications are launched in the background per hour. Each hour the individual application launch counter can be reset to allow more application launches. However, if the individual application launch rate for the current hour is exceeded for a particular application, then the particular application cannot be launched again in the current hour and sampling daemon 102 will return a "no" reply to an ok to launch request that identifies the particular application.

Launching a Background Fetch Application

In some implementations, when application manager 106 makes an "ok to launch" call to sampling daemon 102 and receives a "yes" reply, application manager 106 can invoke or launch the identified application (e.g., application 108) in the background of the operating environment of mobile device 100. For example, the application 108 can be launched in the background such that it is not apparent to the user that application 108 was launched. The application 108 can then communicate over a network (e.g., the internet) with content server 404 to download updated content for display to the user. Thus, when the user subsequently invokes application 108 (e.g., brings the application to the foreground), the user will be presented with current and up-to-date content without having to wait for application 108 to download the content and refresh the application's user interfaces.

In some implementations, application manager 106 can be configured to launch background fetch enabled applications when the mobile device 100 is charging and connected to Wi-Fi. For example, sampling daemon 102 can determine when mobile device 100 is connected to an external power source and connected to the network (e.g., internet) over Wi-Fi and send a signal to application manager 106 to cause application manager 106 to launch fetch enabled applications that have been used within a previous amount of time (e.g., seven days).

Example Background Fetch Processes

Figure 6:
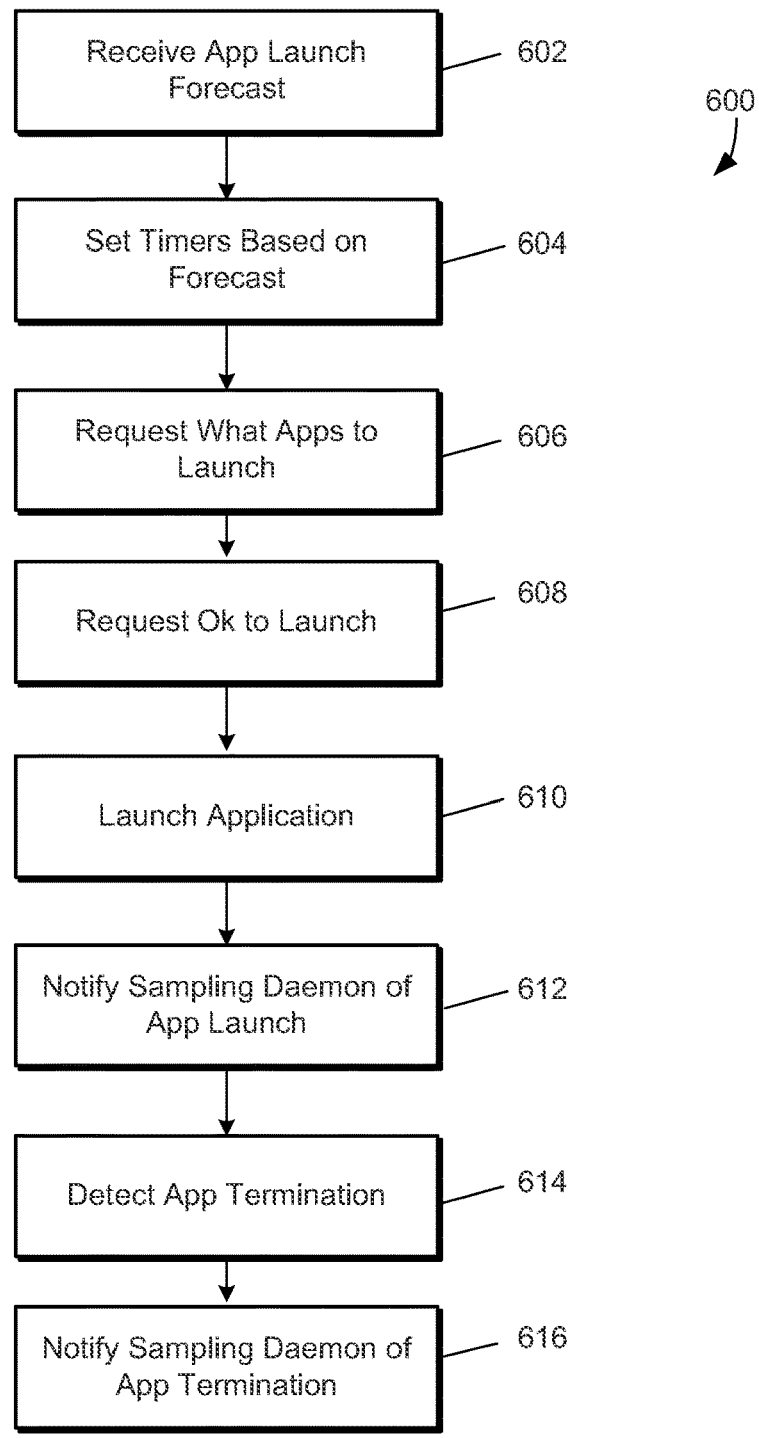
FIG. 6 is a flow diagram of an example process for predictively launching applications to perform background updates.

FIG. 6 is a flow diagram of an example process 600 for predictively launching applications to perform background updates. For example, process 600 can be performed by application manager 106 to determine when to launch background applications configured to fetch data updates from network resources, such as content server 404 of FIG. 4. Additional description related to the steps of process 600 can be found with reference to FIG. 4 above.

At step 602, application manager 106 can receive an application invocation forecast from sampling daemon 102. For example, application manager 106 can be launched during startup of mobile device 100. During its initialization, application manager 106 can request a forecast of applications likely to be invoked by a user of the mobile device 100 over the next 24 hour period. This forecast can indicate when to launch applications, for example. The 24 hour period can be divided into 15 minute blocks and each 15 minute block can be associated with a probability that the user will invoke an application during the 15 minute block. The forecast returned to application manager 106 can identify up to 64 15 minute blocks of time when the user is likely to invoke an application.

At step 604, application manager 106 can set timers based on the application launch forecast. For example, application manager 106 can set a timer or alarm for each of the 15 minute blocks identified in the application launch forecast returned to the application manager 106 by sampling daemon 102.

At step 606, application manager 106 can request sampling daemon 102 identify what applications to launch. For example, when a timer expires or alarm goes off, application manager can wake, if sleeping or suspended, and request from sampling daemon 102 a list of applications to launch for the current 15 minute block of time. Sampling daemon 102 can return a list of applications that should be launched in the background on mobile device 100.

At step 607, application manager 106 can send a request to sampling daemon 102 asking if it is ok to launch an application. For example, for each application identified by sampling daemon 102 in response to the "what to launch" request, application manager 106 can ask sampling daemon 102 whether it is ok to launch the application. Sampling daemon 102 can return "yes" if it is ok to launch the application, "no" if it is not ok to launch the application or "never" if it is never ok to launch the application.

At step 610, application manager 106 can launch an application. For example, if sampling daemon 102 returns an "ok" response for the "ok to launch" request, application manager 106 will launch the application as a background process of mobile device 100. If sampling daemon 102 returns a "no" or "never" response to the "ok to launch" request, application manager 106 will not launch the application.

At step 612, application manager 106 can transmit an application launch notification to sampling daemon 102. For example, sampling daemon 102 can use the application launch notification to generate application launch statistics, data usage statistics, energy use statistics and/or other application related statistics as needed.

At step 614, application manager 106 can detect that the launched application has terminated. For example, application manager 106 can determine when the launched application is no longer running on mobile device 100.

At step 616, application manager 106 can transmit an application termination notification to sampling daemon 102. For example, sampling daemon 102 can use the application termination notification to generate application launch statistics, data usage statistics, energy use statistics and/or other application related statistics as needed.

Figure 7:
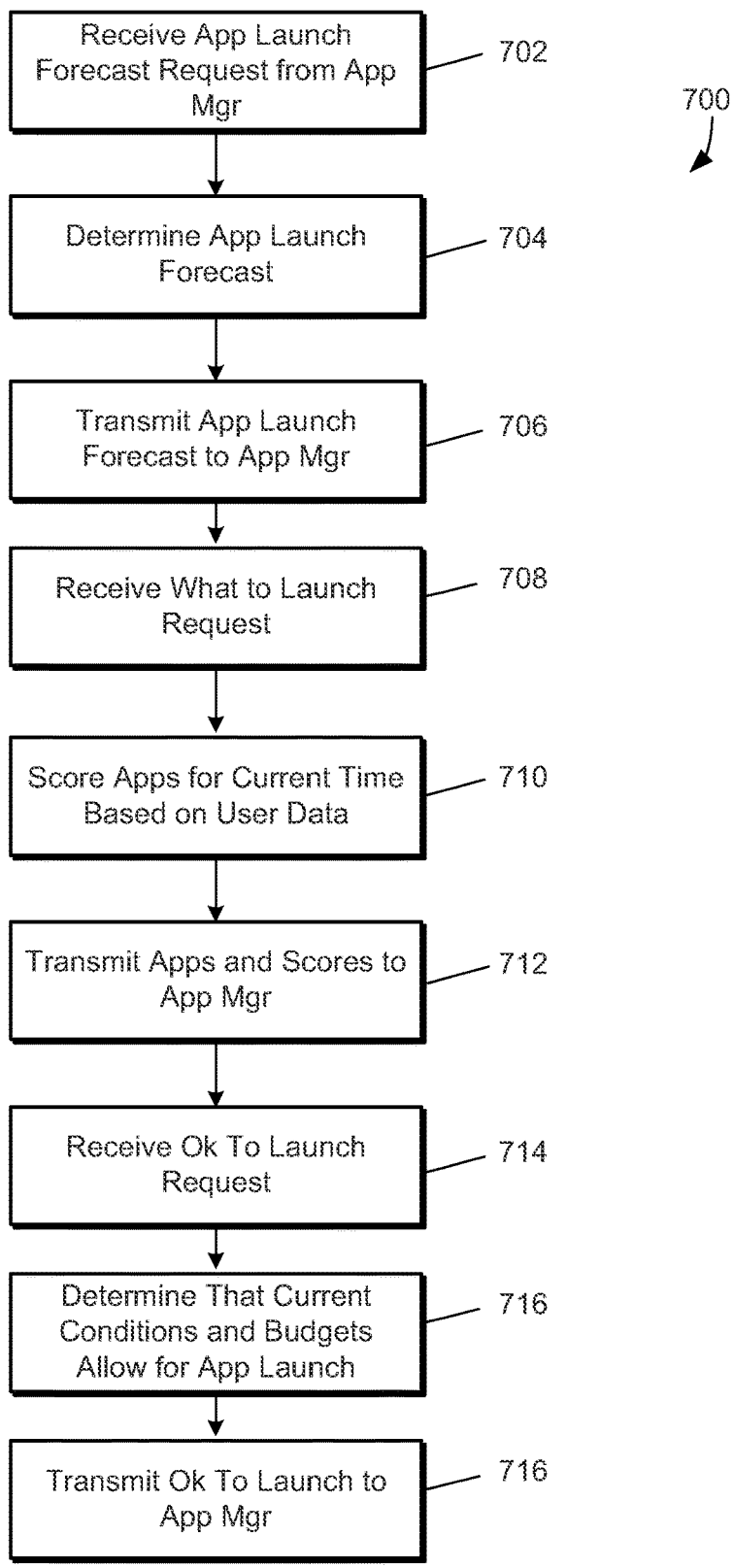
FIG. 7 is a flow diagram of an example process for determining when to launch applications on a mobile device.

FIG. 7 is a flow diagram of an example process 700 for determining when to launch applications on a mobile device 100. For example, process 700 can be used to determine when to launch applications, what applications should be launched and if it is ok to launch applications based on application use statistics, data and energy budgets and mobile device conditions, as described above in detail with reference to FIG. 4

At step 702, sampling daemon 102 can receive an application launch forecast request from application manager 106. For example, application manager 106 can request an application launch forecast for the next 24 hours. Once the 24 hour period has passed, application manager 106 can request an application launch forecast for the subsequent 24 hour period. For example, application manager 106 can request an application launch forecast every 24 hours.

At step 704, sampling daemon 102 can determine an application launch forecast. For example, the application launch forecast be used to predict when user initiated application launches are likely to occur during a 24 hour period. For example, sampling daemon 102 can determine an application launch forecast for a 24 hour period. The 24 hour period can be divided into 15 minute time blocks. For each 15 minute time block (e.g., there are 96 15 minute time blocks in a 24 hour period), sampling daemon 102 can use historical user invocation statistics determine a probability that a user initiated application launch will occur in the 15 minute time block, as described above with reference to FIG. 4.

At step 706, sampling daemon 102 can transmit the application launch forecast to application manager 106. For example, sampling daemon 102 can select up to 64 15 minute blocks having the highest non-zero probability of a user initiated application launch. Each of the selected 15 minute blocks can be identified by a start time for the 15 minute block (e.g., 12:45 pm). Sampling daemon 102 can send the list of 15 minute block identifiers to application manager 106 as the application launch forecast.

At step 708, sampling daemon 102 can receive a request for what applications to launch at a current time. For example, application manager 106 can send a request to sampling daemon 102 for sampling daemon 102 to determine which applications should be launched at or around the current time.

At step 710, sampling daemon 102 can score applications for the current time based on historical user data. Sampling daemon 102 can determine which applications that the user is likely to launch in the near future based on historical user initiated application launch data collected by sampling daemon 102. Sampling daemon 102 can utilize recent application launch data, daily application launch data and/or weekly application launch data to score applications based on the historical likelihood that the user will invoke the application at or around the current time, as described above with reference to FIG. 4 and FIG. 5.

At step 712, sampling daemon 102 can transmit the applications and application scores to application manager 106. For example, sampling daemon 102 can select a number (e.g., three) of applications having the highest scores (e.g., highest probability of being invoked by the user) to transmit to application manager 106. Sampling daemon 102 can exclude applications that have been launched within a previous period of time (e.g., the previous 5 minutes). Sampling daemon 102 can transmit information that identifies the highest scored applications and their respective scores to application manager 106, as described above with reference to FIG. 4.

At step 714, sampling daemon 102 can receive a request from application manager 106 to determine whether it is ok to launch an application. For example, sampling daemon 102 can receive an "ok to launch" request that identifies an application.

At step 716, sampling daemon 102 can determine that current mobile device conditions and budgets allow for an application launch. For example, sampling daemon 102 can analyze the environmental conditions of the mobile device 100, data and energy budgets, application launch rate limits, network conditions and other data to determine if the current time is a good time to launch an application, as described in detail above with reference to FIG. 4.

At step 718, sampling daemon 102 can transmit a reply to application manger 106 indicating that it is ok to launch the identified application. For example, if conditions are good for a background application launch, sampling daemon 102 can return a "yes" value to application manager 106 so that application manager 106 can launch the identified application.

Short Term Trending

In some implementations, sampling daemon 102 can be configured to detect when applications are trending and predictively launch the applications in the background on mobile device 100 based on the detecting trend. For example, an application is trending if the application is being repeatedly invoked by a user of mobile device 100. In some cases, the trending application is a new application or, prior to the trend, a rarely used application that may not be included in the "what to launch" application forecasting described above. Thus, the trending application may not be kept up to date using the application launch forecasting methods described above.

The purpose of application launch trend detection is to detect applications which are being launched repeatedly by the user and to determine an approximate cadence (e.g., periodicity) with which the applications are being launched, erring on reporting a smaller cadence. Applications that are being invoked repeatedly by a user are said to be "trending." The determined cadence can then be used by application manager 106 to set timers that will trigger the application manager 106 to launch the trending applications in the background so that the applications will be updated when the user invokes the applications, as described above. For example, if the cadence is 5 minutes for an application, application manager 106 can set a timer that will expire every 4 minutes and cause application manager 106 to launch the application so that the application can receive updated content and update the application's interfaces before being invoked again by the user. In some implementations, the trend detection mechanisms described herein can be used to detect other system event trends beyond application launches, such as repeated software or network notifications, application crashes, etc.

In some implementations, sampling daemon 102 can maintain a trending table that can be used to track the behavior of a number of applications. The trending table can include an application identification field (APPID), a state field (STATE), a last launch timestamp (LLT), an inter-launch cadence (ILC) that indicates the amount of time between launches, and a confidence field (C).

Figure 8:
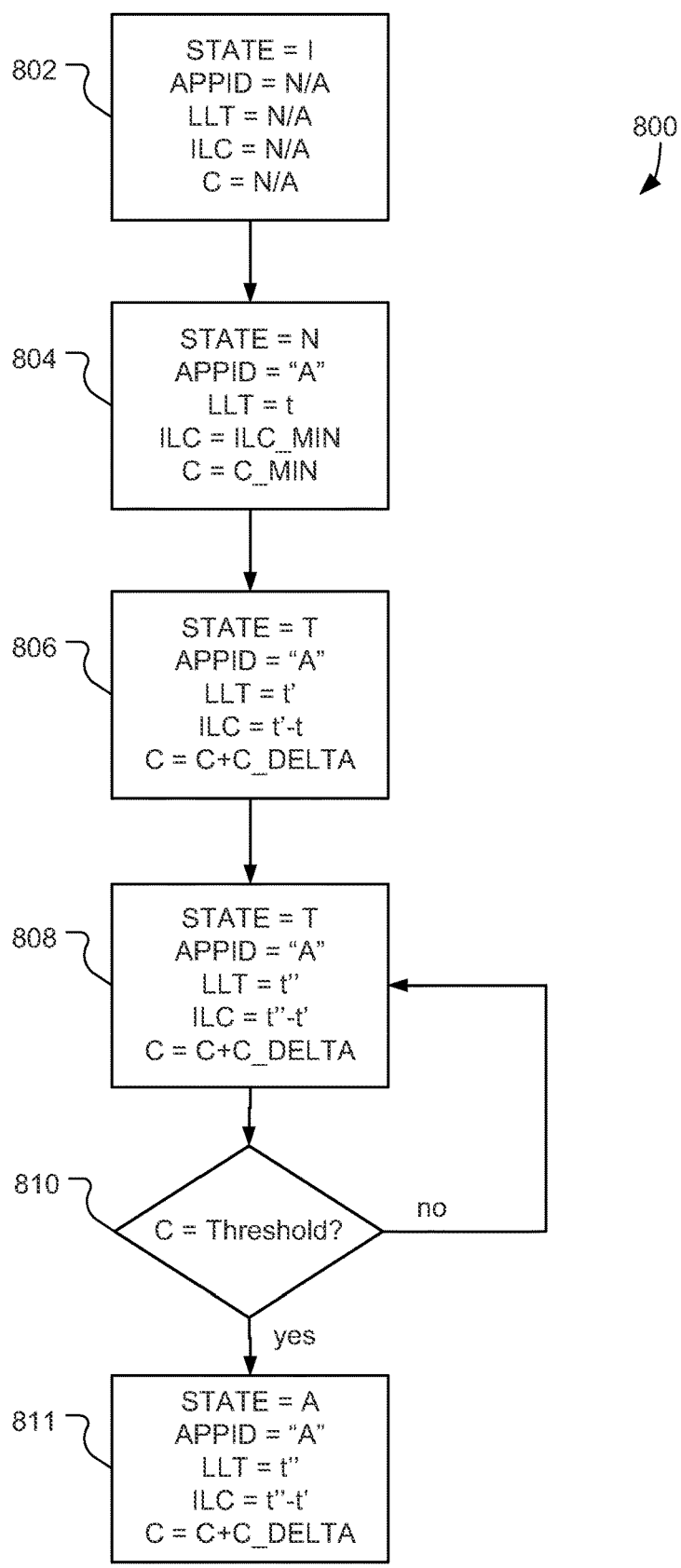
FIG. 8 is a flow diagram illustrating state transitions for an entry in a trending table.

FIG. 8 is a flow diagram 800 illustrating state transitions for an entry (e.g., application) in the trending table. Initially at step 802, the trending table can include empty entries (e.g., records) where the APPID, LLT, ILC and C fields are empty (e.g., N/A) and the STATE is set to "invalid" (I). When an application is launched at time t, the trending table is scanned for an available entry (e.g., an entry in state I). Among the possible invalid entries, several methods can be used for selecting an entry to use. For example, a random invalid entry can be selected. Alternatively, an invalid entry can be selected such that all the empty entries in the trending table are kept in consecutive order. If no invalid entry exists, the oldest entry (or a random entry) in transient (T) state can be selected to track the newly launched application. If no I or T state entries exist, the oldest new (N) state entry can be selected to track the newly launched application.

At step 804, once the trending table entry is selected, the STATE field of the selected entry for tracking the newly launched application can be set to new (N), the APPID can be set to an identifier for the newly launched application, the LLT field can be set to the current time t (e.g., wall clock time) and the ILC and C fields are set to predefined minimum values ILC_MIN (e.g., 1 minute) and C_MIN (e.g., zero).

At step 806, on the next launch of the same application at time t', the entry in the table for the application is found, if it still exists and has not been evicted (e.g., selected to track another application). The STATE of the entry is set to transient (T), the ILC is set to the difference between the LLT and the current system time (e.g., t'−t or t'−LLT), and the C field is incremented (e.g., by predefined value C_DELTA). Alternatively, the ILC field can be set to some other function of its old and new values, such as the running average.

At step 808, on the next launch of the same application at time t'', the entry in the table for the application is found, if it still exists and has not been evicted (e.g., selected to track another application). The STATE of the entry can remain set to transient (T), the ILC is set to the difference between the LLT and the current wall clock time (e.g., t''−t' or t''−LLT), and the C field is incremented again (e.g., by predefined value C_DELTA).

At step 810, if, after several launches of the application, the C value of the trending table entry reaches (e.g., equals) a threshold value (e.g., C_HIGHTHRESHOLD), at step 811, the state of the application entry can be changed to STATE=A. If, at step 810, the C value of the trending table entry does not reach the threshold value (e.g., C_HIGH-THRESHOLD), the values of the entry can be updated according to step 808.

Whenever the application is launched while in state "A", if the time between the last launch and the time of launch is within some amount of time (e.g., ILC_EPSILON=5 minutes), then the application entry's confidence (C) field is incremented until it reaches a predefined maximum value (e.g., C_MAX). When an application entry in the trending table is in the active (A) state, the entry's ILC value can be used as an estimation of the rate of launch (e.g., cadence) and the entry's APPID can be used to identify the trending application.

In some implementations, sampling daemon 102 can send the application identifier (APPID) and cadence value (ILC) to application manager 106 so that application manager 106 can launch the identified application in the background in anticipation of a user invocation of the application so that the application can receive updated content prior the user launching the application, as described above. For example, application manager 106 can start a timer based on the cadence value that will wake the application manager 106 to launch the application in anticipation of a user invoking the application.

In some implementations, sampling daemon 102 can send application manager 106 a signal or notification indicating that a trending application should be launched by application manager 106. For example, application manager 106 can register interest in an application by sending sampling daemon 102 an application identifier. Sampling daemon 102 can monitor the application for user invocation to determine whether the application is trending, as described above. If the application is trending, sampling daemon 102 can determine the cadence of invocation, as described above, and send a notification or signal to application manager 106 at a time determined based on the cadence. For example, if the cadence is four minutes, sampling daemon 102 can send a signal to application manager 106 every 3 minutes to cause application manager 106 to launch the application. If the cadence changes to six minutes, sampling daemon 102 can detect the cadence change and adjust when application manager 106 is signaled. For example, sampling daemon 102 can signal application manager 106 to launch the application every 5 minutes instead of every 3 minutes to adjust for the decreased cadence (e.g., increased time period between invocations).

At each inspection of the trending table for any reason (e.g., adding a new entry, updating an existing entry, etc.), all entries in STATE=T or STATE=A whose time since last launch is greater than their ILC by ILC_EPSILON will have their C values decremented. Any entry whose C value at that point falls below a minimum threshold value (e.g., C_LOWTHRESHOLD) is demoted. An entry can be demoted from state A to state T or from state T to state I, for example.

In some implementations, the trend detection mechanism described above can be used to detect trending events other than application invocations or launches. For example, the trend detection method and trending table described above can be used to detect and track any recurring event on mobile device 100. A trending event can include screen touches, network connections, application failures, the occurrence of network intrusions and/or any other event that can be reported or signaled to sampling daemon 102.

Push Notifications

Figure 9:
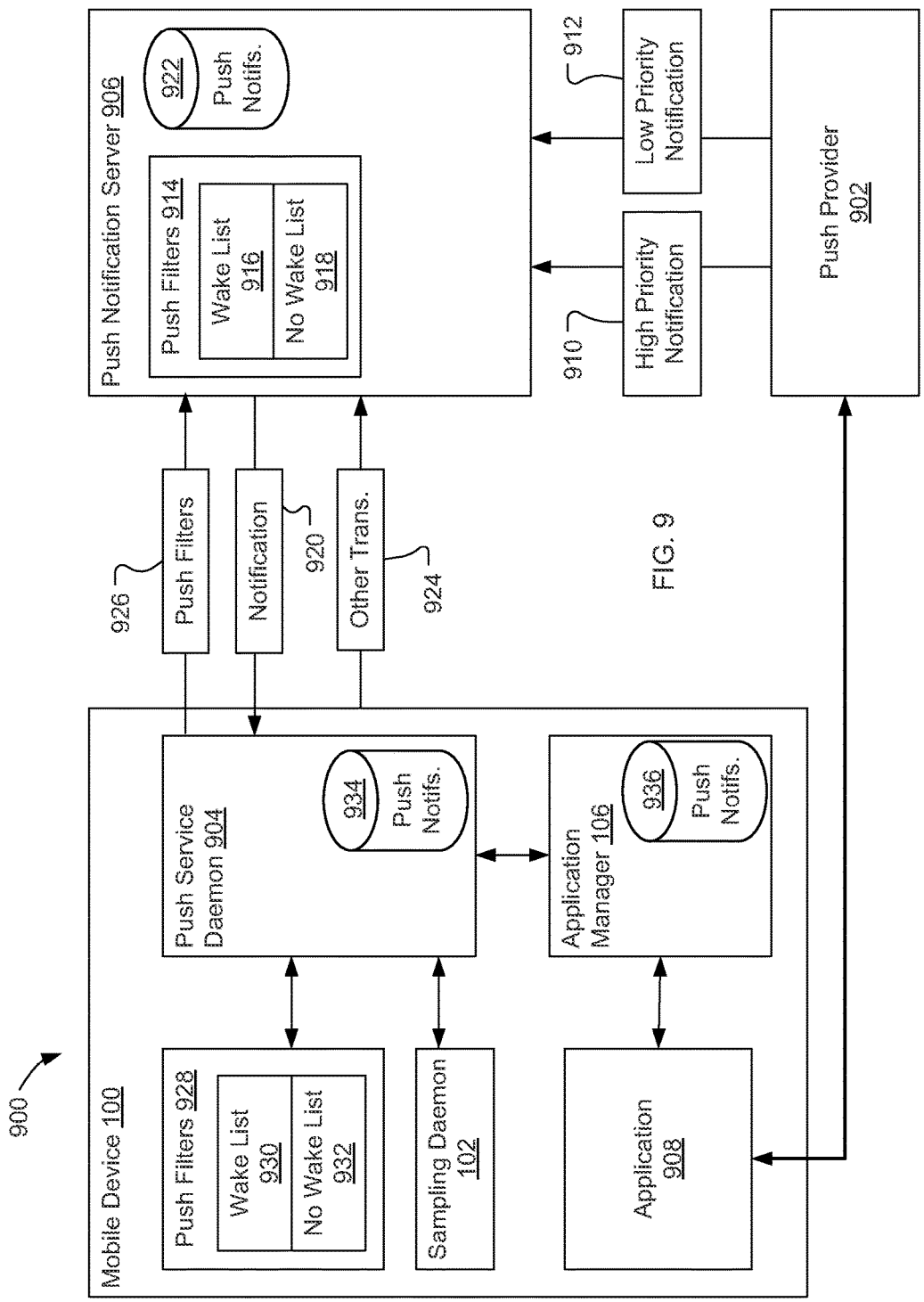
FIG. 9 is a block diagram illustrating a system for providing push notifications to a mobile device.

FIG. 9 is a block diagram 900 illustrating a system for providing push notifications to a mobile device 100. In some implementations, mobile device 100 can be configured to receive push notifications. For example, a push notification can be a message that is initiated by a push provider 902 and sent to a push service daemon 904 running on mobile device 100 through push notification server 906.

In some implementations, push provider 902 can receive authorization to send push notifications to mobile device 100 through a user authorization request presented to a user of mobile device 100 by application 908. For example, push provider 902 can be a server owned, operated and/or maintained by the same vendor that created (e.g., programmed, developed) application 908. Push provider 902 can receive authorization from a user to send push notifications to mobile device 100 (e.g., push service daemon 904) when application 908 presents a user interface on mobile device 100 requesting authorization for push provider 902 to send push notifications to mobile device 100 and the user indicates that push notifications are authorized. For example, the user can select a button on the user interface presented by application 908 to indicate that push notifications are authorized for the push provider 902 and/or application 908. Push provider 902 can then receive a device token that identifies mobile device 100 and that can be used to route push notifications to mobile device 100. For example, push notification server 906 can receive a device token with a push notification and use the device token to determine which mobile device 100 should receive the push notification.

In some implementations, mobile device 100 can send information identifying authorized push applications to push notification server 906. For example, mobile device 100 can send a message 926 containing push notification filters 914 and the device token for mobile device 100 to push notification server 906. Push notification server 906 can store a mapping of device tokens (e.g., identifier for mobile device 100) to push filters 914 for each mobile device serviced by push notification server 906. Push filters 914 can include information identifying applications that have received authorization to receive push notifications on mobile device 100, for example.

In some implementations, push filters 914 can be used by push notification server 906 to filter out (e.g., prevent sending) push notifications to applications that have not been authorized by a user of mobile device 100. Each push notification sent by push provider 902 to push notification server 906 can include information (e.g., an identifier) that identifies the application 908 associated with push provider 902 and the mobile device 100 (e.g., device token).

When notification server 906 receives a push notification, notification server 906 can use the mobile device identification information (e.g., device token) to determine which push filters 914 to apply to the received push notification. Notification server 906 can compare application identification information in the push notification to the push filters 914 for the identified mobile device to determine if the application associated with push provider 902 and identified in the push notification is identified in the push filter 914. If the application associated with the push notification is identified in the push filters 914, then the notification server 906 can transmit the push notification received from push provider 902 to mobile device 100. If the application identified in the push notification is not identified in the push filters 914, then the notification server will not transmit the push notification received from push provider 902 to mobile device 100 and can delete the push notification.

Non-Waking Push Notifications

In some implementations, notification server 906 can be configured to process high priority push notifications and low priority push notifications. For example, push provider 902 can send a high priority push notification 910 and/or a low priority push notification 912 to push notification server 906. Push provider 902 can identify a push notification as high or low priority by specifying the priority of the push notification in data contained within the push notification sent to push notification server 906 and mobile device 100, for example.

In some implementations, push notification server 906 can process low priority push notification 912 differently than high priority push notification 910. For example, push notification server 906 can be configured to compare application identification information contained in high priority push 910 with authorized application identification information in push filters 914 to determine if high priority push notification 910 can be transmitted to mobile device 100. If the application identification information in high priority push notification 910 matches an authorized application identifier in push filters 914, then push notification server 906 can transmit the high priority push notification to mobile device 100. If the application identification information in high priority push notification 910 does not match an authorized application identifier in push filters 914, then push notification server 906 will not transmit the high priority push notification to mobile device 100.

In some implementations, push notification server 906 can be configured to delay delivery of low priority push notifications. For example, when mobile device 100 receives a push notification from push notification server 906, the receipt of the push notification causes mobile device 100 to wake up (e.g., if in a sleep or low power state). When mobile device 100 wakes, mobile device 100 will turn on various subsystems and processors that can drain the battery, use cellular data, cause the mobile device 100 to heat up or otherwise effect the mobile device 100. By preventing or delaying the delivery of low priority push notifications to mobile device 100, mobile device 100 can conserve network (e.g., cellular data) and system (e.g., battery) resources, for example.

In some implementations, push notification filters 914 can include a wake list 916 and a no wake list 918. The wake list 916 can identify applications for which low priority push notifications should be delivered to mobile device 100. In some implementations, when an application is authorized to receive push notifications at mobile device 100, the application identification information is added to the wake list 916 by default. The no wake list 918 can identify authorized applications for which low priority push notifications should be delayed. The specific mechanism for populating no wake list 918 and/or manipulating wake list 916 and no wake list 918 is described in detail below when describing push notification initiated background updates. In some implementations, high priority push notifications will not be delayed at the push notification server 906 and will be delivered to mobile device 100 as long as the application identified in the high priority push notification is identified in push filters 914 (e.g., wake list 914 and/or no wake list 918).

In some implementations, when push notification server 906 receives a low priority push notification 912, push notification server 906 can compare the application identifier in low priority push notification 912 to wake list 916 and/or no wake list 918. For example, if the application identification information in the low priority push notification 912 matches an authorized application identifier in the wake list 916, the low priority push notification 912 will be delivered to the mobile device 100 in a notification message 920.

In some implementations, delivery of low priority push notifications associated with applications identified in the no wake list 918 can be delayed. For example, if an application identified in low priority push notification 912 is also identified in no wake list 918, then low priority push notification 912 can be stored in push notification data store 922 and not immediately delivered to mobile device 100. In some implementations, if the mobile device 100 identified by a push notification (high or low priority) is not currently connected to push notification server 906, the push notification for the disconnected mobile device 100 can be stored in push notification data store 922 for later delivery to mobile device 100.

In some implementations, push notifications stored in push data store 922 will remain in push data store 922 until the application identifier associated with a stored push notification is moved from the no wake list 918 to wake list 916 or until a network connection is established between push notification server 906 and mobile device 100. For example, a network connection between push notification server 906 and mobile device 100 can be established when another (high or low priority) push notification is delivered to mobile device 100 or when mobile device 100 sends other transmissions 924 (e.g., status message, heartbeat message, keep alive message, etc.) to push notification server 906. For example, mobile device 100 can send a message 924 to push notification server 905 indicating that the mobile device 100 will be active for a period of time (e.g., 5 minutes) and push notification server 906 can send all received push notifications to mobile device 100 during the specified active period of time. In some implementations, when a network connection is established between mobile device 100 and push notification server 906 all push notifications stored in push notification store 922 will be delivered to mobile device 100. For example, push notifications stored in push notification data store 922 can be transmitted through connections created by other transmissions between mobile device 100 an push notification server 906.

In some implementations, mobile device 100 can establish two different communication channels with push notification server 906. For example, the two communication channels can be established simultaneously or at different times. The mobile device 100 can have a cellular data connection and/or a Wi-Fi connection to push notification server 906, for example. In some implementations, mobile device 100 can generate and transmit to push notification server 906 different push filters 914 for each communication channel. For example, a cellular data connection can be associated with first set of push filters 914 for determining when to send high and low priority push notifications across the cellular data connection. A Wi-Fi data connection can be associated with a second set of push filters 914 that are the same or different than the cellular data push filters for determining when to send high and low priority push notifications across the Wi-Fi data connection. When push notification server 906 receives a push notification, push notification server can compare the application identified in the push notification to the push notification filters for the communication channel (e.g., Wi-Fi, cellular) that the push notification server 906 will use to transmit the push notification to the mobile device 100.

Push Initiated Background Updates

In some implementations, receipt of push notifications by mobile device 100 can trigger a background update of applications on the mobile device 100. For example, when mobile device 100 (e.g., push service daemon 904) receives a push notification message 920 from push notification server 906, push service daemon 904 can compare the application identifier in the push notification message 920 to push filters 928 stored on mobile device 100 to determine if the push notification message 920 was properly delivered or should have been filtered (e.g., not delivered) by push notification server 906. For example, push filters 928, wake list 930 and no wake list 932 can correspond to push filters 914, wake list 916 and no wake list 918, respectively. In some implementations, if push service daemon 904 determines that the push notification message 920 should not have been delivered to mobile device 100, the push notification message 920 will be deleted.

Low Priority Push Notifications

In some implementations, the push notification message 920 received by mobile device 100 can include a low priority push notification. For example, the low priority push notification can indicate that content updates are available for the application associated with the push notification. Thus, when the low priority push notification causes an launch of an application 908, the application 908 can download updated content from one or more network resources (e.g., push provider 902).

In some implementations, when push service daemon 904 receives a low priority push notification associated with an application (e.g., application 908) on mobile device 100, push service daemon 904 can ask sampling daemon 102 if it is ok to launch the application associated with the received low priority push notification. For example, push service daemon 904 can invoke the "ok to launch" interface of sampling daemon 102 by sending sampling daemon 102 an identifier for the application associated with the received low priority push notification. Sampling daemon 102 can check data budgets, energy budgets, environmental conditions and rate limits, as described above with reference to FIG. 4, and returns to push service daemon 904 a value indicating whether it is ok to launch the application identified by the low priority push notification.

In some implementations, if the value returned from the "ok to launch" request indicates "yes" it is ok to launch the application, push service daemon 904 will send the low priority push notification to application manager 106 and application manager 106 can invoke the application (e.g., application 908). Application 908 can then communicate with push provider 902 over the network (e.g., the internet) to receive updated content from push provider 902.

In some implementations, if the value returned from the "ok to launch" request indicates "no" it is not ok to launch the application, push service daemon 904 will store the low priority push notification in push notification data store 934. For example, when storing a low priority push notification, push service daemon 904 will only store the last push notification received for the application identified in the push notification.

In some implementations, when sampling daemon 102 indicates that push service daemon 904 should not launch an application right now (e.g., the "ok to launch" reply is "no"), push service daemon 904 can move the application identifier for the application from wake list 930 to no wake list 932. For example, if sampling daemon 102 determines that the budgets, limits and/or conditions of the mobile device do not allow for launching the application, allowing the push notification server 906 to wake mobile device 100 for additional low priority push notifications associated with the application will just further consume the data and energy budgets of the mobile device 100 or make environmental conditions worse (e.g., cause the device to heat up). Thus, by moving the application identifier into the no wake list 932 and sending a message 926 to push notification server 906 that includes the updated filters 928 (e.g., wake list 930 and no wake list 932), notification server 906 can update its own push filters 914, wake list 916 and no wake list 918 to reflect the changes to push filters 928 and to prevent additional low priority push notifications for the application from being delivered to mobile device 100.

In some implementations, if the value returned from the "ok to launch" request indicates that it is "never" ok to launch the application, push service daemon 904 will delete the low priority push notification and remove the application identifier associated with the push notification from push filters 928. The updated push filters can be transmitted to push notification server 906 and push filters 914 on push notification server 906 can be updated to prevent push notification server 906 from sending any more push notifications associated with the application identifier.

In some implementations, sampling daemon 102 can transmit a "stop" signal to push service daemon 904 to temporarily prevent future low priority push notifications from being sent from push notification server 906 to mobile device 100. For example, sampling daemon 102 can send a stop signal to push service daemon 904 when sampling daemon determines that the global application launch rate limit has been exceeded, the push data budget is exhausted for the current hour, the push energy budget is exhausted for the current hour, the system is experiencing a thermal event (e.g., mobile device 100 is too hot), the mobile device 100 has a poor cellular connection and the mobile device 100 is not connected to Wi-Fi and/or that the mobile device 100 is connected to a voice call and not connected to Wi-Fi. When push service daemon 904 receives a stop signal, push service daemon 904 can move the application identifiers in wake list 930 to no wake list 932 and transmit the updated push filters 928 to push notification server 906 to update push filters 914. Thus, push notification server 906 will temporarily prevent future low priority push notifications from waking mobile device 100 and impacting the budgets, limits and operating conditions of mobile device 100.

In some implementations, sampling daemon 102 can transmit an "ok to retry" signal to push service daemon 904. For example, sampling daemon 102 can monitor the status of the budgets, network connections, limits and device conditions and will send an "ok to retry" message to push service daemon 904 when the push data budget is not exhausted, when the energy budget is not exhausted, when the mobile device 100 is not experiencing a thermal event, when the mobile device 100 has a good quality cellular connection or is connected to Wi-Fi, when mobile device 100 is not connected to a voice call and when the launch rate limits have been reset. Once the push service daemon 904 receives the "ok to retry" signal, push service daemon 904 will send an "ok to launch" request to sampling daemon 102 for each push notification in push notification data store 934 to determine if it is ok to launch each application associated with the stored push notifications.

If sampling daemon 102 returns a "yes" from the ok to launch request, push service daemon 904 can send the push notification to application manager 106 and application manager 106 can launch the application associated with the push notification as a background process on mobile device 100, as described above. Once the application is launched, the application can download content or data updates and update the applications user interfaces based on the downloaded data. Application manager 106 will not ask sampling daemon 102 if it is ok to launch an application associated with a low priority push notification.

High Priority Push Notifications

In some implementations, the push notification message 920 received by mobile device 100 can include a high priority push notification. For example, the high priority push notification can indicate that content updates are available for the application associated with the push notification. Thus, when the high priority push notification causes an invocation of an application, the application can download updated content from one or more network resources. In some implementations, when a high priority push notification is received by push service daemon 904, push service daemon 904 will send the high priority push notification to application manager 106 without making an "ok to launch" request to sampling daemon 102.

In some implementations, when application manager 106 receives a push notification associated with an application, application manager 106 will make an "ok to launch" request to sampling daemon 102. In response to the "ok to launch" request, sampling daemon 102 can reply with "yes," "no," or "never" responses as described above. When application manager 106 receives a "yes" reply to the ok to launch request, application manager 106 can launch the application associated with the received high priority push notification as a background process on mobile device 100.

In some implementations, when application manager 106 receives a "no" reply to an "ok to launch" request, application manager 106 can store the high priority push notification in high priority push notification store 936. When application manager 106 receives a "never" response, application manager 106 can delete the high priority push notification and delete any push notifications stored in push notification data store 936 for the application associated with the push notification.

In some implementations, sampling daemon 102 can send an "ok to retry" signal to application manager 106. For example, when application manager 106 receives an "ok to retry" message from sampling daemon 102, application manager 106 can make an "ok to launch" request for the applications associated with each high priority push notification in high priority push notification data store 936 and launch the respective applications as background processes when a "yes" reply is received in response to the "ok to launch" request.

Delaying Display of Push Notifications

In some implementations, high priority push notifications can cause a graphical user interface to be displayed on mobile device 100. For example, receipt of a high priority push notification can cause a banner, balloon or other graphical object to be displayed on a graphical user interface of mobile device 100. The graphical object can include information indicating the subject matter or content of the received push notification, for example.

In some implementations, when application manager 106 receives a high priority push notification, application manager 106 can cause the notification to be displayed on a graphical user interface of the mobile device 100. However, when the high priority push notification indicates that there are data updates to be downloaded to the application associated with the high priority push notification, the application can be launched in the background of mobile device 100 before the push notification is displayed. For example, application manager 106 can be configured with an amount of time (e.g., 30 seconds) to delay between launching an application associated with the high priority push notification and displaying the graphical object (e.g., banner) that announces the push notification to the user. The delay can allow the application enough time to download content updates and update the application's user interfaces before being invoked by the user, for example. Thus, when the user provides input to the graphical object or otherwise invokes the application associated with the high priority push notification, the application's user interfaces will be up to date and the user will not be forced to wait for updates to the application. In some implementations, if application manager 106 is unable to launch the application associated with the high priority push notification, the mobile device 100 will display the graphical object (e.g., banner) to notify the user that the high priority push notification was received.

Example Push Notification Processes

Figure 10:
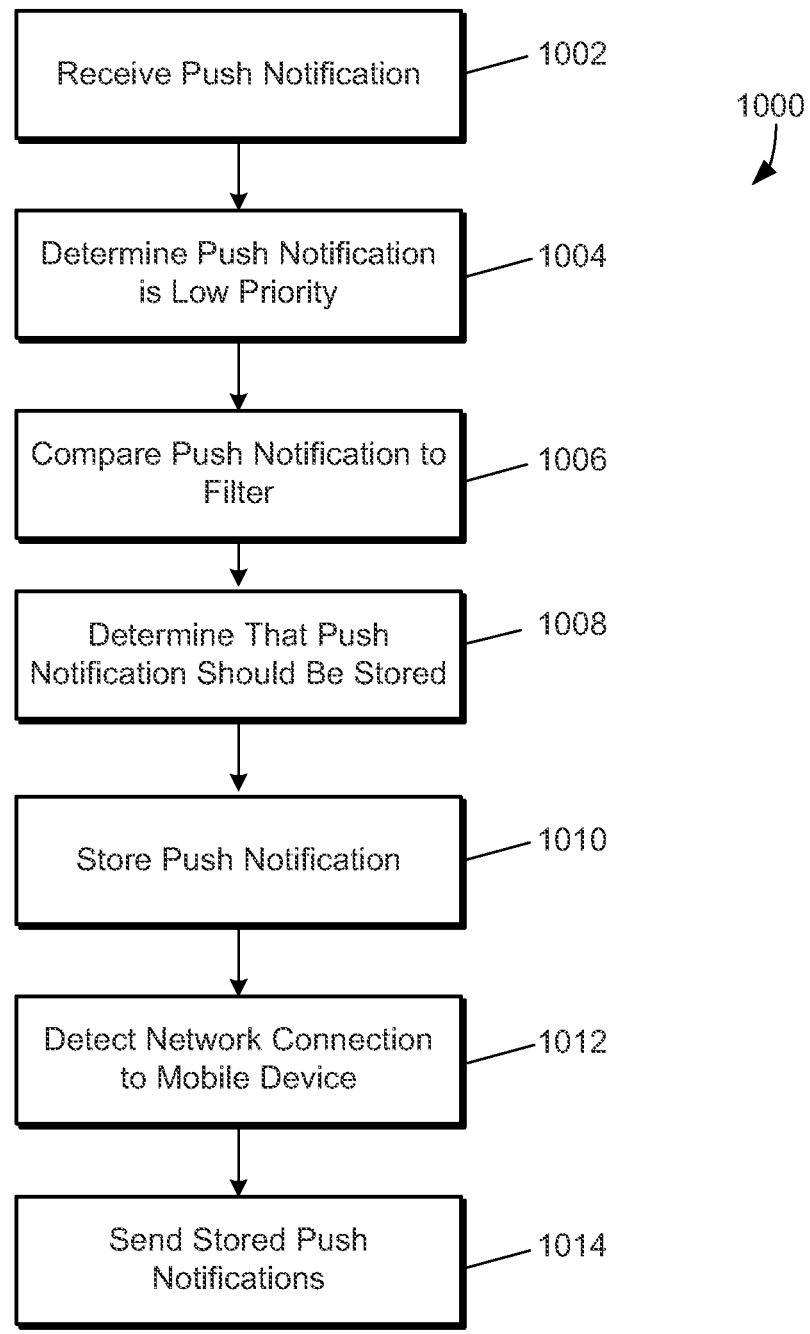
FIG. 10 is a flow diagram of an example process for performing non-waking pushes at a push notification server.

FIG. 10 is a flow diagram of an example process 1000 for performing non-waking pushes at a push notification server 906. At step 1002, push notification server 906 can receive a push notification. For example, push notification server 906 can receive a push notification from a push notification provider 902 (e.g., a server operated by an application vendor).

At step 1004, push notification server 906 can determine that the push notification is a low priority push notification. For example, the push notification provider can include data in the push notification that specifies the priority of the push notification. Push notification server 906 can analyze the contents of the push notification to determine the priority of the push notification.

At step 1006, push notification server 906 can compare the push notification to a push notification filter. For example, the push notification can identify an application installed or configured on mobile device 100 to which the low priority push notification is directed. The push notification can include an application identifier, for example. Push notification server 906 can compare the application identifier in the push notification to application identifiers in the push notification filter's no wake list 918.

At step 1008, push notification server 906 can determine that the low priority push notification should be stored. For example, if the application identifier from the low priority push notification is in the push notification filter's no wake list 918, the push notification server 906 can determine that the low priority push should be stored in push notification data store 922.

At step 1010, based on the determination at step 1008, the low priority push notification will be stored in a database or data store 922 of the push notification server 906 and not immediately sent to the mobile device 100.

At step 1012, push notification server 906 can determine that a network connection to mobile device 100 has been established. For example, push notification server 906 can create a network connection to mobile device 100 to deliver another high or low priority push. Mobile device 100 can establish a network connection to push notification server 906 to send notification filter changes, periodic status updates, keep alive messages or other messages to push notification server 906.

At step 1014, push notification server 906 can send the stored push notifications in response to determining that a network connection to mobile device 100 has been established. For example, push notification server 906 can send the low priority push notifications stored at the push notification server 906 to mobile device 100.

Figure 11:
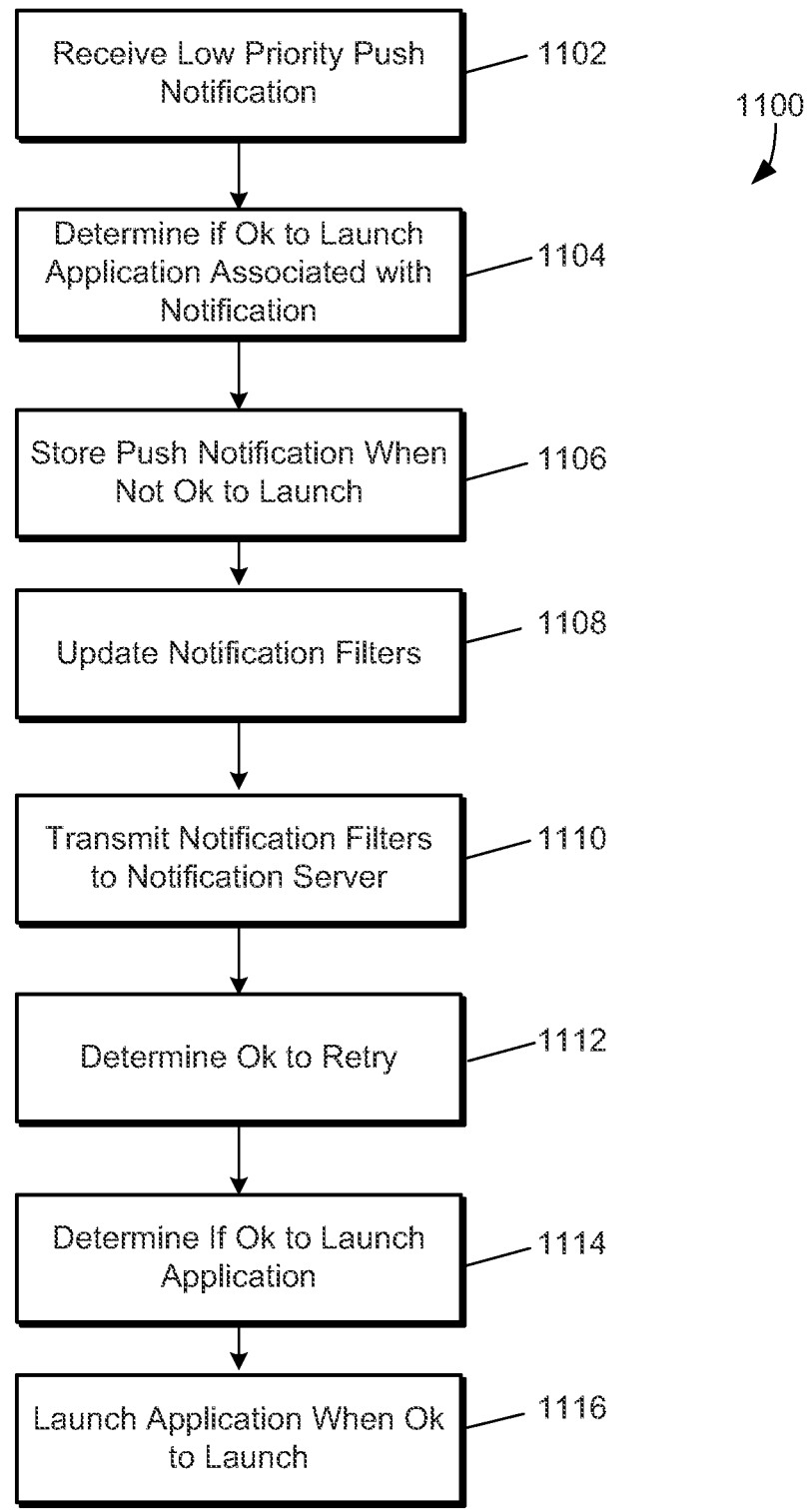
FIG. 11 is a flow diagram of an example process for performing background updating of an application in response to a low priority push notification.

FIG. 11 is a flow diagram of an example process 1100 for performing background updating of an application in response to a low priority push notification. At step 1102, mobile device 100 can receive a low priority push notification from push notification server 906.

At step 1104, mobile device 100 can determine if it is ok to launch an application associated with the low priority push notification. For example, the application can be launched as a background process on mobile device 100. Mobile device 100 can determine whether it is ok to launch the application based on data and energy budgets determined for the mobile device 100. Mobile device 100 can determine whether it is ok to launch the application based on conditions of the mobile device, and/or the condition of the mobile device's network connections. Mobile device 100 can determine whether it is ok to launch the application based on device-wide (e.g., global) and individual application launch limits (e.g., how many applications can be launched per hour, how many times a single application can be launched per hour). The details for determining whether it is ok to launch an application are described in greater detail with reference to FIG. 4 above.

At step 1106, mobile device 100 can store the low priority push notification when device conditions, budgets, limits and other data indicate that it is not ok to launch the application. For example, mobile device 100 can store the low priority push notifications in a database or other data store on mobile device 100.

At step 1108, mobile device 100 can update its push notification filters in response to determining that it is not ok to launch a background application. For example, mobile device 100 can move the application associated with the low priority push notification to the no wake list of the push notification filters on mobile device 100.

At step 1110, mobile device 100 can transmit the updated notification filters to push notification server 906. Push notification server 906 can update its own push notification filters based on the filters received from mobile device 100 to determine when to transmit and when to not transmit low priority push notifications to mobile device 100.

At step 1112, mobile device 100 can determine that it is ok to retry launching applications associated with low priority push notifications. For example, mobile device 100 can determine that the budgets, limits and device conditions, as described above, allow for launching additional background applications on the mobile device 100.

At step 1114, mobile device 100 can determine whether it is ok to launch a particular application associated with a stored low priority push notification. For example, mobile device 100 can determine that the budgets and limits configured on mobile device 100 have been reset or replenished for the current time and that the environmental conditions of the mobile device 100 and network connections are good enough to launch the particular background application.

At step 1116, mobile device 100 can launch the particular application when the mobile device 100 determines that it is ok to launch the application. For example, the particular application can be launched as a background process to download new content and update the user interfaces of the application before a user invokes the application. This process will allow a user to invoke an application and not have to wait for content updates to be downloaded and for user interfaces of the application to be refreshed.

Figure 12:
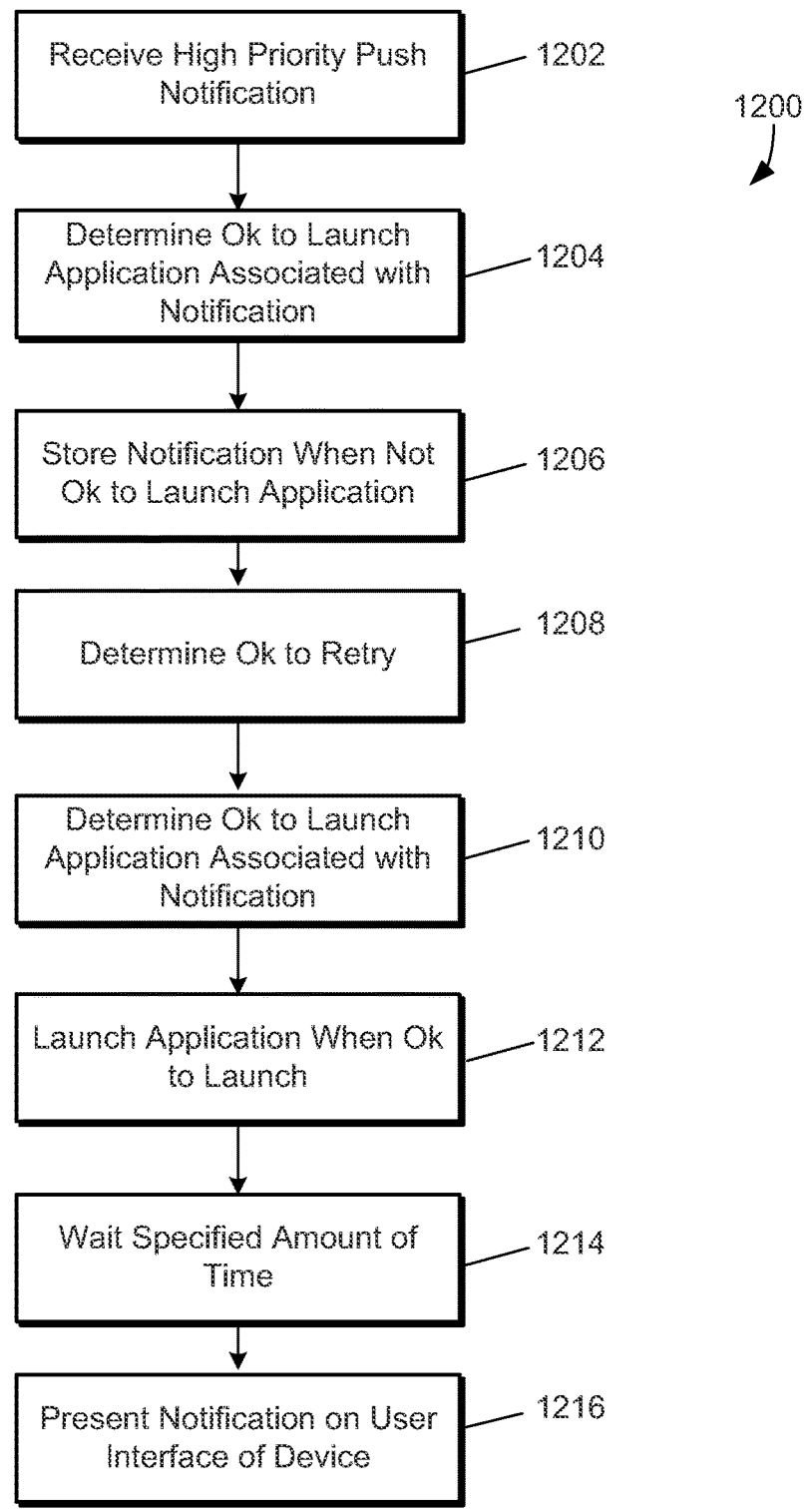
FIG. 12 is a flow diagram of an example process for performing background updating of an application in response to a high priority push notification.

FIG. 12 is a flow diagram of an example process 1200 for performing background updating of an application in response to a high priority push notification. At step 1202, mobile device 100 can receive a high priority push notification.

At step 1204, mobile device 100 can determine if it is ok to launch an application associated with the high priority push notification. For example, mobile device 100 can determine whether it is ok to launch the application based on budgets and environmental conditions of the mobile device 100 (e.g., device conditions, network conditions, etc.).

At step 1206, mobile device 100 can store the high priority push notification when it is not ok to launch the application associated with the high priority push notification. For example, mobile device 100 can store the high priority push notification in a database, queue, or other appropriate data structure.

At step 1208, mobile device 100 can determine that it is ok to retry launching applications associated with stored high priority push notifications. For example, mobile device 100 can determine that it is ok to retry launching applications when the data and energy budgets have been replenished, device conditions have improved, network conditions have improved or other conditions of the mobile device 100 have changed, as discussed above.

At step 1210, mobile device 100 can determine if it is ok to launch an application associated with a stored high priority push notification. For example, mobile device 100 can determine if it is ok to launch an application based on the criteria discussed above.

At step 1212, mobile device 100 can launch the application in the background on the mobile device 100. For example, the application can be launched as a background process on the mobile device 100 so that the application can download updated content from a network resource (e.g., a content server) on a network (e.g., the internet).

At step 1214, the mobile device 100 can wait a period of time before presenting the push notification to the user. For example, the mobile device can be configured to allow the application to download content for a period of time before notifying the user of the received high priority push notification.

At step 1216, the mobile device 100 can present the push notification on a user interface of the mobile device 100. For example, the mobile device 100 can present a graphical object (e.g., a banner) that includes information describing the high priority push notification. The user can select the graphical object to invoke the application, for example. Since the application had time to download content before the user was presented with the notification, when the user invokes the application the application will be able to display updated content to the user without forcing the user to wait for the updated content to be downloaded from the network.

Background Uploading/Downloading

Figure 13:
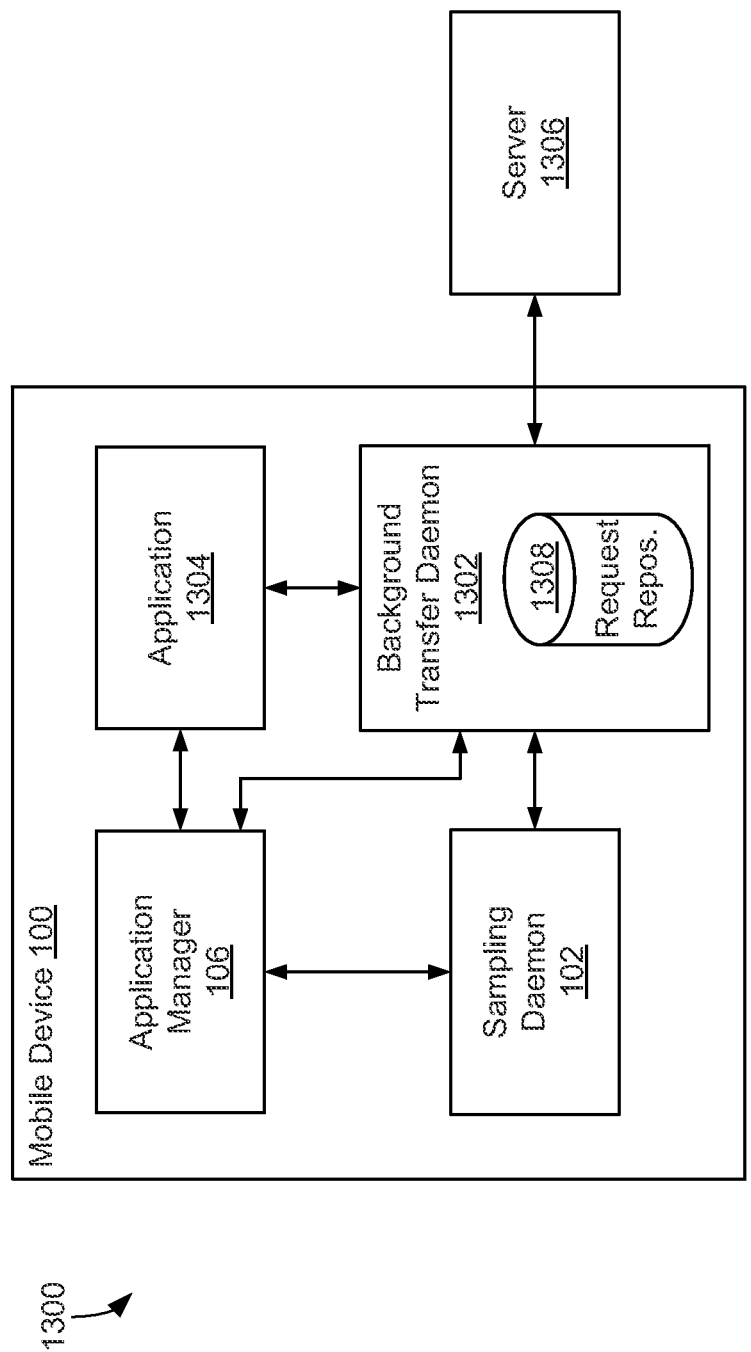
FIG. 13 is a block diagram an example system for performing background downloading and/or uploading of data on a mobile device.

FIG. 13 is a block diagram an example system 1300 for performing background downloading and/or uploading of data on a mobile device 100. A background download and/or upload can be a network data transfer that is initiated by an application without explicit input from the user. For example, a background download could be performed to retrieve the next level of a video game while the user is playing the video game application. In contrast, a foreground download or upload can be a network data transfer performed in response to an explicit indication from the user that the download or upload should occur. For example, a foreground download could be initiated by a user selecting a webpage link to download a picture, movie or document. Similarly, background uploads can be distinguished from foreground uploads based on whether or not an explicit user request to upload data to a network resource (e.g. server) was received from the user.

In some implementations, foreground downloads/uploads (e.g., downloads/uploads explicitly requested by a user) are performed immediately for the user. For example, the user requested downloads/uploads are performed immediately and are not subject to budgeting constraints or other considerations. Foreground downloads/uploads can be performed over a cellular data connection. In contrast, background downloads and/or uploads can be performed opportunistically and within budgeting constraints and considering environmental conditions, such as the temperature of the mobile device 100. In some implementations, background downloads and/or uploads can be restricted to Wi-Fi connections.

In some implementations, system 1300 can include background transfer daemon 1302. In some implementations, background transfer daemon 1302 can be configured to perform background downloading and uploading of data or content on behalf of applications or processes running on mobile device 100. For example background transfer daemon 1302 can perform background download and/or uploads between application 1304 and server 1306 on behalf of application 1304. Thus, the background downloads/uploads can be performed out of process from application 1304 (e.g., not performed in the process requesting the download/upload).

In some implementations, application 1304 can initiate a background download/upload by sending a request to background transfer daemon 1302 to download or upload data. For example, a request to download data (e.g., content) can identify a network location from where the data can be downloaded. A request to upload data can identify a network location to which the data can be uploaded and a location where the data is currently stored on the mobile device 100. The request can also identify application 1304. Once the request has been made, application 1304 can be shut down or suspended so that the application will not continue consuming computing and/or network resources on mobile device 100 while the background download/upload is being performed by background transfer daemon 1302.

In some implementations, upon receiving a request to perform a background upload or download of data, background transfer daemon 1302 can send a request to sampling daemon 102 to determine if it is ok for background transfer daemon 1302 to perform a data transfer over the network.

In response to receiving the "ok to transfer" request from background transfer daemon 1302, sampling daemon 102 can determine if the data and/or energy budgets for background downloads/uploads have been exhausted for the current hour. However, if sampling daemon 102 determines that the mobile device 100 is connected to an external power source, sampling daemon 102 will not prevent a background download/upload based on the energy budget. Sampling daemon 102 can determine if mobile device 100 is connected to Wi-Fi. Sampling daemon 102 can also determine whether mobile device 100 is in the middle of a thermal event (e.g., operating temperature above a predefined threshold value). If sampling daemon 102 determines that the data budget is exhausted and the mobile device 100 is not connected to Wi-Fi, that the energy budget is exhausted and the mobile device 100 is not connected to an external power source, or that the mobile device 100 is in the middle of a thermal event, then sampling daemon 102 will return a "no" reply to the "ok to transfer" request by process 1302.

In some implementations, when background transfer daemon 1302 receives a "no" reply to the "ok to transfer" request from sampling daemon 102, process 1302 can store the background download/upload request from application 1304 in request repository 1308.

In some implementations, sampling daemon 102 can send an "ok to retry" signal to background transfer daemon 1302. For example, sampling daemon 102 can send the ok to retry signal to background transfer daemon 1302 when the data and energy budgets are replenished and when the system is no longer experiencing a thermal event. Sampling daemon 102 can send the ok to retry signal to background transfer daemon 1302 when the mobile device 100 is connected to Wi-Fi, connected to external power and when the system is not experiencing a thermal event.

In some implementations, when the "ok to retry" signal is received by background transfer daemon 1302, background transfer daemon 1302 can send an "ok to transfer" request to sampling daemon 102. If sampling daemon 102 returns an "ok" reply, background transfer daemon 1302 can perform the background download or upload for application 1304. Once a background download is completed, background transfer daemon 1302 can wake or invoke application 1304 and provide application 1304 with the downloaded data.

In some implementations, background transfer daemon 1302 can notify sampling daemon 102 when the background download/upload starts and ends so that sampling daemon 102 can adjust the budgets and maintain statistics on the background downloads/uploads performed on mobile device 100. In some implementations, background transfer daemon 1302 can transmit the number of bytes transferred over cellular data, over Wi-Fi and/or in total so that sampling daemon 102 can adjust the budgets and maintain statistics on the background downloads/uploads performed on mobile device 100.

In some implementations, sampling daemon 102 can return a timeout value to background transfer daemon 1302 in response to an "ok to transfer" request. For example, the timeout value can indicate a period of time (e.g., 5 minutes) that the background transfer daemon has to perform the background download or upload. When the timeout period elapses, background transfer daemon 1302 will suspend the background download or upload.

In some implementations, the timeout value can be based on remaining energy budgets for the current hour. For example, sampling daemon 102 can determine how much energy is consumed each second while performing a download or upload over Wi-Fi based on historical data collected by sampling daemon 102. Sampling daemon 102 can determine the time out period by dividing the remaining energy budget by the rate at which energy is consumed while performing a background download or upload (e.g., energy budget/energy consumed/time=timeout period).

In some implementations, background downloads and/or uploads are resumable. For example, if mobile device 100 moves out of Wi-Fi range, the background download/upload can be suspended (e.g., paused). When mobile device 100 reenters Wi-Fi range, the suspended download/upload can be resumed. Similarly, if the background download/upload runs out of energy budget (e.g., timeout period elapses), the background download/upload can be suspended. When additional budget is allocated (e.g., in the next hour), the suspended download/upload can be resumed.

In some implementations, background downloads/uploads can be suspended based on the quality of the network connection. For example, even though mobile device 100 can have a good cellular data connection between mobile device 100 and the servicing cellular tower and a good data connection between the cellular tower and the server that the mobile device 100 is transferring data to or from, mobile device 100 may not have a good connection to the server. For example, the transfer rate between the mobile device 100 and the server may be slow or the throughput of the cellular interface may be low. If the transfer rate of the background download/upload falls below a threshold transfer rate value and/or the throughput of the background download/upload falls below a threshold throughput value, the background download/upload (e.g., data transfer) can be suspended or paused based on the detected poor quality network connection until a better network connection is available. For example, if a Wi-Fi connection becomes available the suspended background download/upload can be resumed over the Wi-Fi connection.

In some implementations, background transfer daemon 1302 can be configured with a limit on the number of background downloads and/or uploads that can be performed at a time. For example, background transfer daemon 1302 can restrict the number of concurrent background downloads and/or uploads to three.

Example Background Download/Upload Process

Figure 14:
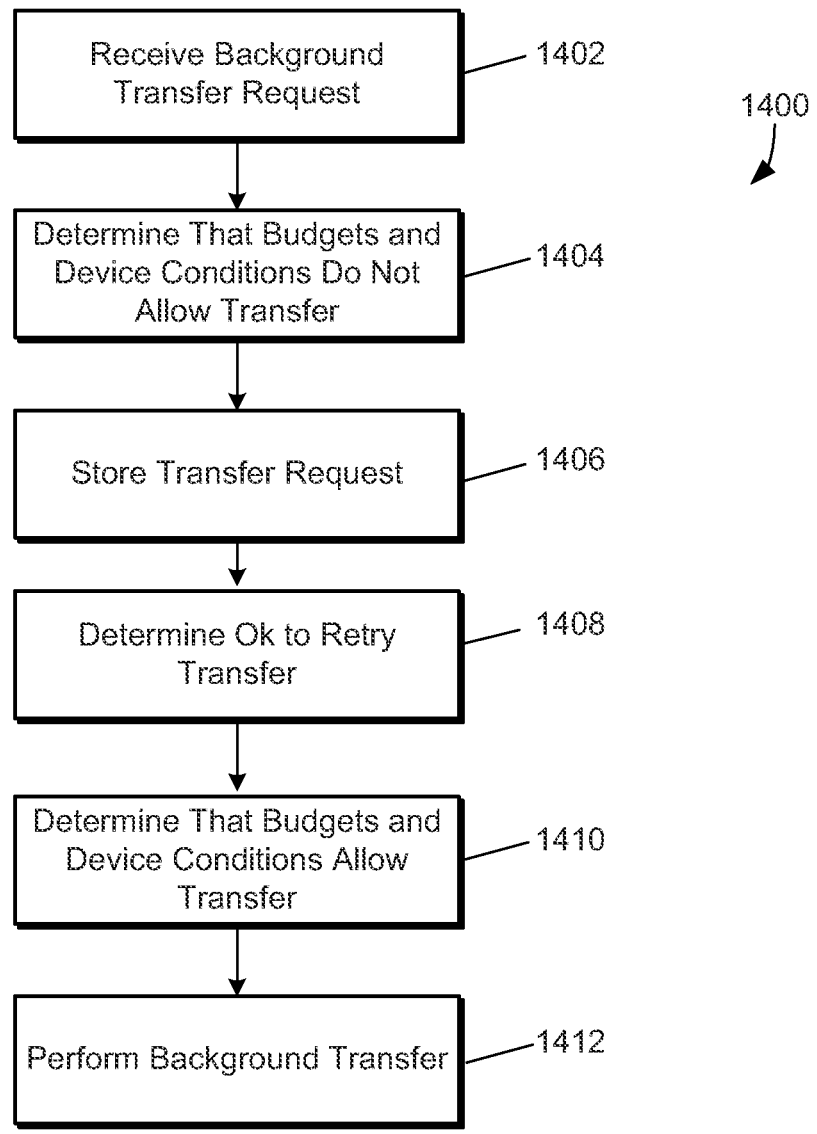
FIG. 14 is flow diagram of an example process for performing background downloads and uploads.

FIG. 14 is flow diagram of an example process 1400 for performing background downloads and uploads. For example, background downloads and/or uploads can be performed on behalf of applications on mobile device 100 by background transfer daemon 1302.

At step 1402, a background transfer request can be received. For example, background transfer daemon 1302 can receive a background download/upload request from an application running on mobile device 100. Once the application makes the request, the application can be terminated or suspended, for example. The request can identify the application and identify source and/or destination locations for the data. For example, when downloading data the source location can be a network address for a server and the destination location can be a directory in a file system of the mobile device 100. When uploading data, the source location can be a file system location and the destination can be a network location.

At step 1404, mobile device 100 can determine that budgets and device conditions do not allow for the data transfer. For example, background transfer daemon 1302 can ask sampling daemon 102 if it is ok to perform the requested background transfer. Sampling daemon 102 can determine if energy and data budgets for background download/upload are exhausted and if the mobile device 100 is in the middle of a thermal event. If the background download/upload budgets are exhausted or if the mobile device 100 is in the middle of a thermal event, sampling daemon 102 can send a message to background transfer daemon 1302 indicating that it is not ok to perform the background data transfer.

At step 1406, mobile device 100 can store the background transfer request. For example, background transfer daemon 1302 can store the transfer request in a transfer request repository.

At step 1408, mobile device 100 can determine that it is ok to retry the background transfer. For example, sampling daemon 102 can determine that the data and energy budgets have been replenished and that the mobile device 100 is not in the middle of a thermal event. Sampling daemon 102 can send a retry message to background transfer daemon 1302. Background transfer daemon 1302 can then attempt to perform the requested transfers stored in the transfer request repository.

At step 1410, mobile device 100 can determine that budgets and conditions of the mobile device 100 allow for background data transfer. For example, background transfer daemon 1302 can ask sampling daemon 102 if it is ok to perform the requested background transfer. Sampling daemon 102 can determine that energy and data budgets for background download/upload are replenished and that the mobile device 100 is not in the middle of a thermal event. If the background download/upload budgets are not exhausted or if the mobile device 100 is not in the middle of a thermal event, sampling daemon 102 can send a message to background transfer daemon 1302 indicating that it is ok to perform the background data transfer.

At step 1412, mobile device 100 can perform the background transfer. For example, background transfer daemon 1302 can perform the requested background download or background upload for the requesting application. Background transfer daemon 1302 can notify sampling daemon 102 when the background transfer begins and ends. Background transfer daemon 1302 can send a message informing sampling daemon of the number of bytes transferred during the background download or upload. Once the background transfer is complete, background transfer daemon 1302 can invoke (e.g., launch or wake) the application that made the background transfer request and send completion status information (e.g., success, error, downloaded data, etc.) to the requesting application.

Enabling/Disabling Background Updates

Figure 15:
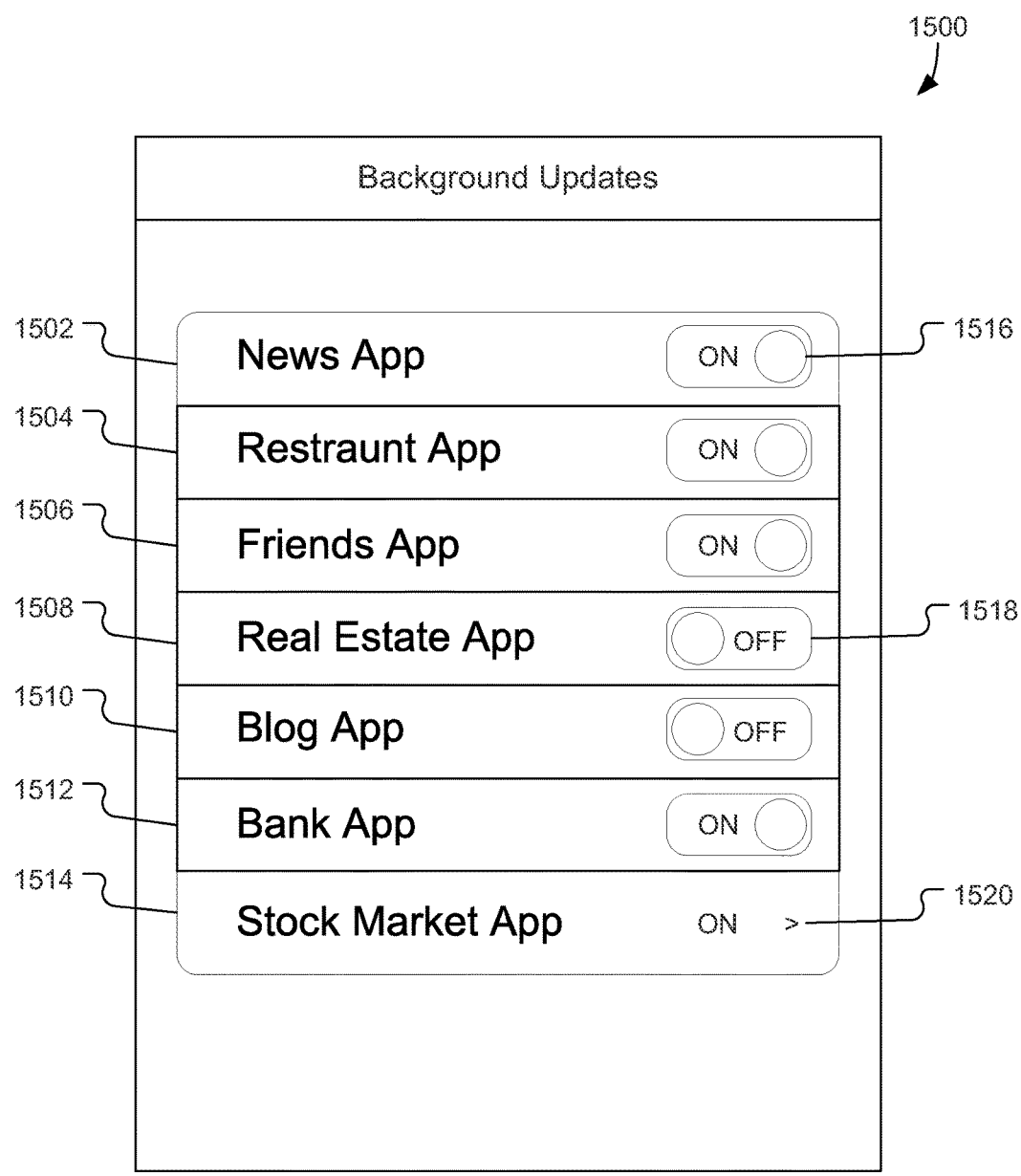
FIG. 15 illustrates an example graphical user interface (GUI) for enabling and/or disabling background updates for applications on a mobile device.

FIG. 15 illustrates an example graphical user interface (GUI) 1500 for enabling and/or disabling background updates for applications on a mobile device. For example, GUI 1500 can be an interface presented on a display of mobile device 100 for receiving user input to adjust background update settings for applications on mobile device 100.

In some implementations, user input to GUI 1500 can enable or disable background updates from being performed for applications based on a user invocation forecast, as described above. For example, sampling process 102 and/or application manager 106 can determine whether background updates are enabled or disabled for an application and prevent the application from being launched by application manager 106 or prevent the application from being included in application invocation forecasts generated by sampling process 102. For example, if background updates are disabled for an application, sampling daemon 102 will not include the application the user invoked application forecast requested by when application manager 106. Thus, application manager 106 will not launch the application when background updates are disabled. Conversely, if background updates are enabled for the application, the application may be included in the application invocation forecast generated by sampling daemon 102 based on user invocation probabilities, as described above.

In some implementations, user input to GUI 1500 can enable or disable background updates from being performed for applications when a push notification is received, as described above. For example, sampling process 102, application manager 106 and/or push service daemon 904 can determine whether background updates are enabled or disabled for an application and prevent the application from being launched by application manager 106 in response to receiving a push notification. For example, if background updates are disabled for an application and a push notification is received for the application, application manager 106 will not launch the application to download updates in response to the push notification.

In some implementations, GUI 1500 can display applications 1502-1514 that have been configured to perform background updates. For example, the applications 1502-1514 can be configured or programmed to run as background processes on mobile device 100 when launched by application manager 106. When run as a background process, the applications 1502-1514 can communicate with various network resources to download current or updated content. The applications 1502-1514 can then update their respective user interfaces to present updated content when invoked by a user of mobile device 100. In some implementations, applications that are not configured or programmed to perform background updates will not be displayed on GUI 1500.

In some implementations, a user can provide input to GUI 1500 to enable and/or disable background updates for an application. For example, a user can provide input (e.g., touch input) to mobile device 100 with respect to toggle 1516 to turn on or off background updates for application 1502. A user can provide input (e.g., touch input) to mobile device 100 with respect to toggle 1518 to turn on or off background updates for application 1508.

In some implementations, additional options can be specified for a background update application through GUI 1500. For example, a user can select graphical object 1510 associated with application 1514 to invoke a graphical user interface (not shown) for specifying additional background update options. The background update options can include, for example, a start time and an end time for turning on and/or off background updates for application 1514.

Example System Architecture

Figure 16:
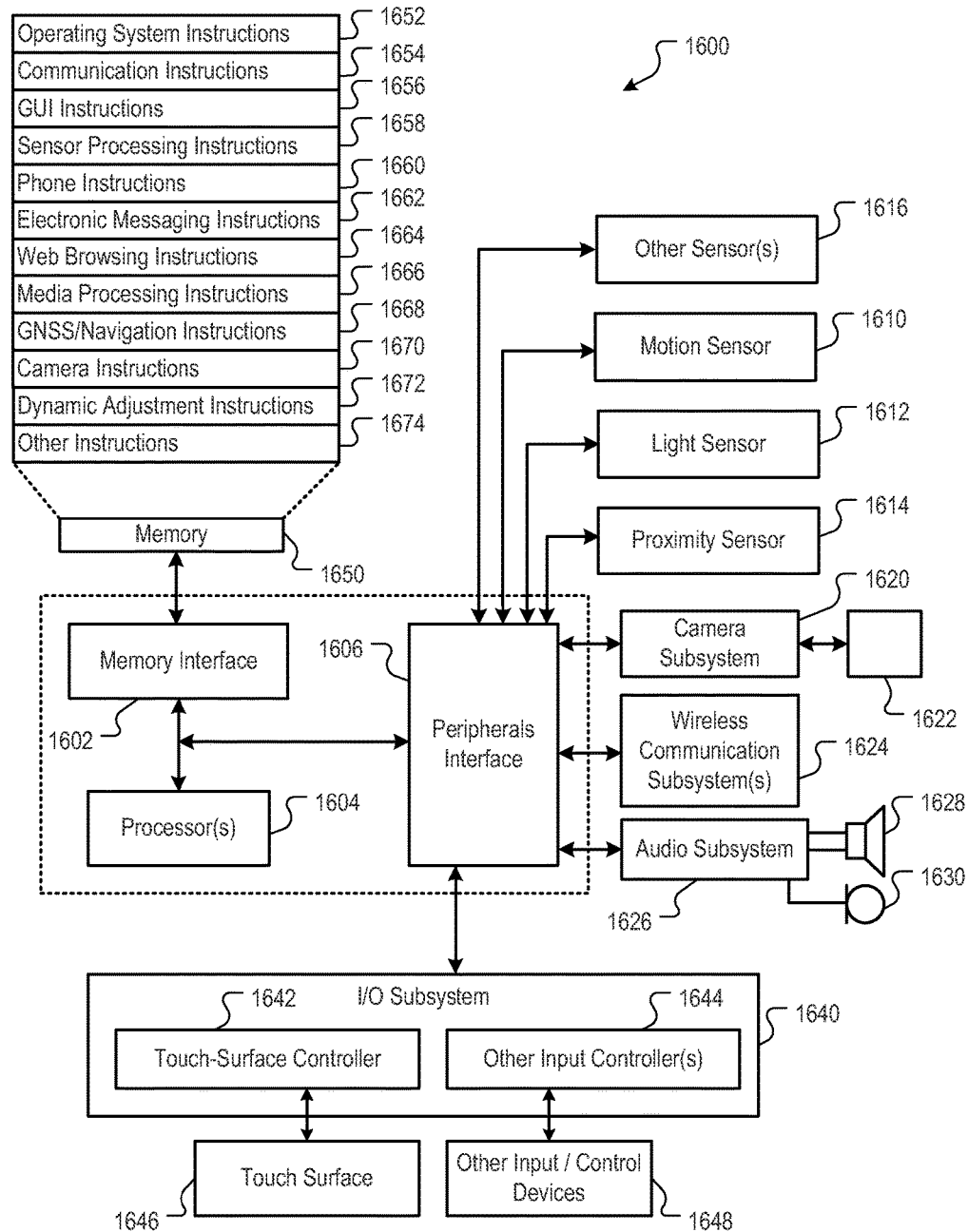
FIG. 16 is a block diagram of an example computing device that can implement the features and processes of FIGS. 1-15.

FIG. 16 is a block diagram of an example computing device 1600 that can implement the features and processes of FIGS. 1-15. The computing device 1600 can include a memory interface 1602, one or more data processors, image processors and/or central processing units 1604, and a peripherals interface 1606. The memory interface 1602, the one or more processors 1604 and/or the peripherals interface 1606 can be separate components or can be integrated in one or more integrated circuits. The various components in the computing device 1600 can be coupled by one or more communication buses or signal lines.

Sensors, devices, and subsystems can be coupled to the peripherals interface 1606 to facilitate multiple functionalities. For example, a motion sensor 1610, a light sensor 1612, and a proximity sensor 1614 can be coupled to the peripherals interface 1606 to facilitate orientation, lighting, and proximity functions. Other sensors 1616 can also be connected to the peripherals interface 1606, such as a global navigation satellite system (GNSS) (e.g., GPS receiver), a temperature sensor, a biometric sensor, magnetometer or other sensing device, to facilitate related functionalities.

A camera subsystem 1620 and an optical sensor 1622, e.g., a charged coupled device (CCD) or a complementary metal-oxide semiconductor (CMOS) optical sensor, can be utilized to facilitate camera functions, such as recording photographs and video clips. The camera subsystem 1620 and the optical sensor 1622 can be used to collect images of a user to be used during authentication of a user, e.g., by performing facial recognition analysis.

Communication functions can be facilitated through one or more wireless communication subsystems 1624, which can include radio frequency receivers and transmitters and/ or optical (e.g., infrared) receivers and transmitters. The specific design and implementation of the communication subsystem 1624 can depend on the communication network(s) over which the computing device 1600 is intended to operate. For example, the computing device 1600 can include communication subsystems 1624 designed to operate over a GSM network, a GPRS network, an EDGE network, a Wi-Fi or WiMax network, and a Bluetooth™ network. In particular, the wireless communication subsystems 1624 can include hosting protocols such that the device 100 can be configured as a base station for other wireless devices.

An audio subsystem 1626 can be coupled to a speaker 1628 and a microphone 1630 to facilitate voice-enabled functions, such as speaker recognition, voice replication, digital recording, and telephony functions. The audio subsystem 1626 can be configured to facilitate processing voice commands, voiceprinting and voice authentication, for example.

The I/O subsystem 1640 can include a touch-surface controller 1642 and/or other input controller(s) 1644. The touch-surface controller 1642 can be coupled to a touch surface 1646. The touch surface 1646 and touch-surface controller 1642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1646.

The other input controller(s) 1644 can be coupled to other input/control devices 1648, such as one or more buttons, rocker switches, thumb-wheel, infrared port, USB port, and/or a pointer device such as a stylus. The one or more buttons (not shown) can include an up/down button for volume control of the speaker 1628 and/or the microphone 1630.

In one implementation, a pressing of the button for a first duration can disengage a lock of the touch surface 1646; and a pressing of the button for a second duration that is longer than the first duration can turn power to the computing device 1600 on or off. Pressing the button for a third duration can activate a voice control, or voice command, module that enables the user to speak commands into the microphone 1630 to cause the device to execute the spoken command. The user can customize a functionality of one or more of the buttons. The touch surface 1646 can, for example, also be used to implement virtual or soft buttons and/or a keyboard.

In some implementations, the computing device 1600 can present recorded audio and/or video files, such as MP3, AAC, and MPEG files. In some implementations, the computing device 1600 can include the functionality of an MP3 player, such as an iPod™.

The memory interface 1602 can be coupled to memory 1650. The memory 1650 can include high-speed random access memory and/or non-volatile memory, such as one or more magnetic disk storage devices, one or more optical storage devices, and/or flash memory (e.g., NAND, NOR). The memory 1650 can store an operating system 1652, such as Darwin, RTXC, LINUX, UNIX, OS X, WINDOWS, or an embedded operating system such as VxWorks.

The operating system 1652 can include instructions for handling basic system services and for performing hardware dependent tasks. In some implementations, the operating system 1652 can be a kernel (e.g., UNIX kernel). In some implementations, the operating system 1652 can include instructions for performing dynamic adjustment of the mobile device based on user activity. For example, operating system 1652 can implement the dynamic adjustment features as described with reference to FIGS. 1-15.

The memory 1650 can also store communication instructions 1654 to facilitate communicating with one or more additional devices, one or more computers and/or one or more servers. The memory 1650 can include graphical user interface instructions 1656 to facilitate graphic user interface processing; sensor processing instructions 1658 to facilitate sensor-related processing and functions; phone instructions 1660 to facilitate phone-related processes and functions; electronic messaging instructions 1662 to facilitate electronic-messaging related processes and functions; web browsing instructions 1664 to facilitate web browsing-related processes and functions; media processing instructions 1666 to facilitate media processing-related processes and functions; GNSS/Navigation instructions 1668 to facilitate GNSS and navigation-related processes and instructions; and/or camera instructions 1670 to facilitate camera-related processes and functions.

The memory 1650 can store other software instructions 1672 to facilitate other processes and functions, such as the dynamic adjustment processes and functions as described with reference to FIGS. 1-15.

The memory 1650 can also store other software instructions 1674, such as web video instructions to facilitate web video-related processes and functions; and/or web shopping instructions to facilitate web shopping-related processes and functions. In some implementations, the media processing instructions 1666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1650 can include additional instructions or fewer instructions. Furthermore, various functions of the computing device 1600 can be implemented in hardware and/or in software, including in one or more signal processing and/or application specific integrated circuits.

What is claimed is:

1. A method comprising:
    collecting, by a mobile device, event data corresponding to events occurring on the mobile device, the event data including application invocation data associated with user initiated application invocations on the mobile device;
    determining a first current time is within a first time period;
    in response to determining the first current time is within the first time period, generating, by the mobile device, an application invocation forecast for the first time period based on the application invocation data, wherein generating the application invocation forecast includes generating for each of a plurality of second time periods within the first time period a respective ranking score, the ranking score representing how many applications are predicted to be invoked by a user of the mobile device in the corresponding second time period;
    selecting, by the mobile device, a number of the plurality of second time periods based on the ranking scores for each of the plurality of second time periods, where the selected time periods include less than all of the plurality of second time periods;
    determining, by the mobile device, that a second current time is within a particular time period of the selected time periods;
    in response to determining that the second current time is within the particular time period of the selected time periods, determining, by the mobile device, an application score for each of a plurality of applications based on the application invocation data, the application score representing a likelihood that a respective application will be invoked by the user within the particular time period;
    selecting, by the mobile device, a number of the plurality of applications based on the application score, where the selected applications include less than all of the plurality of applications; and
    automatically launching, by the mobile device, at least one of the selected applications as a background process on the mobile device within the particular time period.

2. The method of claim 1, further comprising:
    determining a probability for each of a plurality of applications on the mobile device that the respective application will be invoked by a user during the particular time period; and
    automatically launching, by the mobile device, a particular application of the selected applications as a background process in anticipation of a user invocation of the particular application when a probability for the particular application indicates that the particular application is likely to be invoked by the user.

3. The method of claim 2, further comprising:
    receiving a request; and
    in response to the request, determining whether to launch the particular application based on an energy budget and thermal conditions of the mobile device, the energy budget allocating a portion of a battery capacity of the mobile device for processing application launches during the particular time period.

4. The method of claim 1, wherein the first time period is one day in length, and wherein each of the plurality of second time periods has a length of fifteen minutes.

5. The method of claim 2, wherein determining the probability includes performing time series modeling on the invocation data collected by the mobile device.

6. The method of claim 2, wherein determining the probability includes analyzing recent, daily and weekly user invocation history to calculate a probability that the user will invoke an application at about the current time.

7. The method of claim 1, wherein the second current time comprises a time window that is larger than a time window of the first current time.

8. A method comprising:
    receiving, at a first process on a mobile device, a background data transfer request from a second process on the mobile device;
    determining whether to perform the background data transfer request based on budgeting constraints of the mobile device, wherein the budgeting constraints include an energy budget that allocates a portion of the battery capacity of the mobile device for processing background data transfer requests and thermal conditions of the mobile device;
    performing a background data transfer indicated by the background data transfer request in response to a determination that the budgeting constraints of the mobile device allow the background data transfer; and
    storing the background data transfer request in response to a determination that the background data transfer should not be performed based on the budgeting constraints of the mobile device.

9. The method of claim 8, wherein determining whether to perform the background data transfer request further comprises:
    determining a current operating temperature using one or more temperature sensors of the mobile device; and
    determining whether the current operating temperature is above a predetermined threshold.

10. The method of claim 8, wherein the second process is terminated or suspended after the background data request is received by the first process.

11. The method of claim 8, further comprising:
    after storing the background data transfer request, determining that the background data transfer request can be performed based on budgeting constraints or environmental conditions of the mobile device; and
    performing the background data transfer indicated by the background data transfer request in response to a determination that budgeting constraints and environmental conditions of the mobile device allow the background data transfer.

12. The method of claim 11, further comprising relaunching the second process when the background data transfer is completed.

13. The method of claim 11, further comprising:
while performing the background data transfer, suspending the background data transfer when a poor network connection is detected.

14. The method of claim 11, further comprising:
while performing the background data transfer, suspending the background data transfer when one or more budgets are exceeded.

15. A system comprising:
one or more processors; and
a computer-readable medium including one or more sequences of instructions which, when executed by the one or more processors, causes:
collecting, by a mobile device, event data corresponding to events occurring on the mobile device, the event data including application invocation data associated with user initiated application invocations on the mobile device;
determining a first current time is within a first time period:
in response to determining the current time is within the first time period, generating, by the mobile device, an application invocation forecast for the first time period based on the application invocation data, wherein generating the application invocation forecast includes generating for each of a plurality of second time periods within the first time period a respective ranking score, the ranking score representing how many applications are predicted to be invoked by a user of the mobile device in the corresponding second time period;
selecting, by the mobile device, a number of the plurality of second time periods based on the ranking scores for each of the plurality of second time periods, where the selected time periods include less than all of the plurality of second time periods;
determining, by the mobile device, that a second current time is within a particular time period of the selected time periods;
in response to determining that the second current time is within the particular time period of the selected time periods, determining, by the mobile device, an application score for each of a plurality of applications based on the application invocation data, the application score representing a likelihood that a respective application will be invoked by the user within the particular time period;
selecting, by the mobile device, a number of the plurality of applications based on the application score, where the selected applications include less than all of the plurality of applications; and
automatically launching, by the mobile device, at least one of the selected applications as a background process on the mobile device within the particular time period.

16. The system of claim 15, wherein the instructions cause:
determining a probability for each of a plurality of applications on the mobile device that the respective application will be invoked by a user during the particular time period; and
automatically launching, by the mobile device, a particular application of the selected applications as a background process in anticipation of a user invocation of the particular application when the probability for a particular application indicates that the particular application is likely to be invoked by the user.

17. The system of claim 16, wherein the instructions cause:
receiving a request; and
in response to the request:
determining a current operating temperature using one or more temperature sensors of the system;
determining whether the current operating temperature is above a predetermined threshold; and
determining whether to launch the particular application based on an energy budget and thermal conditions of the mobile device, wherein the energy budget allocates a portion of a battery capacity of the mobile device for processing application launches during the particular time period, and wherein the thermal conditions prevent launching of the particular application in response to the current operating temperature being above the predetermined threshold.

18. The system of claim 15, wherein the first time period is one day in length, and wherein each of the plurality of second time periods has a length of fifteen minutes.

19. The system of claim 16, wherein determining the probability includes performing time series modeling on the invocation data collected by the mobile device.

20. The system of claim 16, wherein determining the probability includes analyzing recent, daily and weekly user invocation history to calculate a probability that the user will invoke an application at about the current time.

* * * * *